(12) United States Patent
Moeny et al.

(10) Patent No.: US 11,746,599 B2
(45) Date of Patent: Sep. 5, 2023

(54) HIGH-POWER CAPACITOR FOR DOWNHOLE ELECTROCRUSHING DRILLING

(71) Applicants: Halliburton Energy Services, Inc., Houston, TX (US); Chevron U.S.A. Inc., San Ramon, CA (US); SDG LLC, Minden, NV (US)

(72) Inventors: William M. Moeny, Bernalillo, NM (US); Kirk Slenes, Albuquerque, NM (US)

(73) Assignees: Halliburton Energy Services, Inc., Houston, TX (US); Chevron U.S.A. Inc., San Ramon, CA (US); SDG, LLC, Minden, NV (US)

( * ) Notice: Subject to any disclaimer, the term of this patent is extended or adjusted under 35 U.S.C. 154(b) by 0 days.

(21) Appl. No.: 17/184,223

(22) Filed: Feb. 24, 2021

(65) Prior Publication Data
US 2021/0180407 A1 Jun. 17, 2021

Related U.S. Application Data

(62) Division of application No. 15/746,337, filed as application No. PCT/US2016/030971 on May 5, 2016, now Pat. No. 10,947,785.
(Continued)

(51) Int. Cl.
*E21B 7/15* (2006.01)
*E21B 10/00* (2006.01)
(Continued)

(52) U.S. Cl.
CPC ............... *E21B 7/15* (2013.01); *E21B 7/00* (2013.01); *E21B 10/00* (2013.01); *H01G 4/1227* (2013.01);
(Continued)

(58) Field of Classification Search
CPC .. E21B 7/15; E21B 7/00; E21B 10/00; H01G 4/1227; H01G 4/1245; H01G 4/30; H01G 4/40; H01G 4/232; H01G 4/22
See application file for complete search history.

(56) References Cited

U.S. PATENT DOCUMENTS

| | | |
|---|---|---|
| 2,592,399 A | 4/1952 | Edsall et al. |
| 4,091,353 A | 5/1978 | Fisk et al. |

(Continued)

FOREIGN PATENT DOCUMENTS

| | | |
|---|---|---|
| WO | 2000/75938 | 12/2000 |
| WO | 2015/124733 | 8/2015 |

OTHER PUBLICATIONS

International Search Report and Written Opinion, PCT Patent Application No. PCT/US2016/030971, dated Aug. 12, 2016; 20 pages.

*Primary Examiner* — Caroline N Butcher
(74) *Attorney, Agent, or Firm* — DeLizio, Peacock, Lewin & Guerra

(57) ABSTRACT

A downhole drilling system is disclosed. The downhole drilling system may include a drill bit including a first electrode and a second electrode. The downhole drilling system may also include a pulse-generating circuit coupled to the first electrode and the second electrode. A capacitor within the pulse-generating circuit may include a plurality of electrode sheets and a plurality of dielectric sheets interleaved with the plurality of electrode sheets. Each of the dielectric sheets may include a composite material including a polymer matrix formed from a polymer component and a nanoparticle component that increases the dielectric constant of the composite material above that of the polymer component.

16 Claims, 11 Drawing Sheets

Related U.S. Application Data

(60) Provisional application No. 62/207,266, filed on Aug. 19, 2015.

(51) Int. Cl.
*E21B 7/00* (2006.01)
*H01G 4/224* (2006.01)
*H01G 4/30* (2006.01)
*H01G 4/40* (2006.01)
*H01G 4/232* (2006.01)
*H01G 4/12* (2006.01)
*H01G 4/14* (2006.01)

(52) U.S. Cl.
CPC ............ *H01G 4/1245* (2013.01); *H01G 4/14* (2013.01); *H01G 4/224* (2013.01); *H01G 4/30* (2013.01); *H01G 4/40* (2013.01); *H01G 4/232* (2013.01)

(56) References Cited

U.S. PATENT DOCUMENTS

| | | |
|---|---|---|
| 6,147,585 A | 11/2000 | Kalra et al. |
| 6,164,388 A | 12/2000 | Martunovich et al. |
| 6,608,760 B2 | 8/2003 | Hartman et al. |
| 6,616,794 B2 | 9/2003 | Hartman et al. |
| 7,416,032 B2 | 8/2008 | Moeny et al. |
| 7,530,406 B2 | 5/2009 | Moeny et al. |
| 7,615,942 B2 | 11/2009 | Sanders et al. |
| 8,172,006 B2 | 5/2012 | Moeny |
| 2002/0101323 A1 | 8/2002 | Ranjan et al. |
| 2009/0133929 A1 | 5/2009 | Rodland |
| 2010/0244585 A1* | 9/2010 | Tan .......................... H01G 4/30 29/25.42 |
| 2013/0140086 A1* | 6/2013 | Moeny .................... E21C 37/18 175/16 |
| 2015/0002258 A1 | 1/2015 | Yoshida et al. |
| 2017/0148571 A1* | 5/2017 | Akada .................... H01G 4/232 |

\* cited by examiner

US 11,746,599 B2

HIGH-POWER CAPACITOR FOR DOWNHOLE ELECTROCRUSHING DRILLING

RELATED APPLICATIONS

This application is a Divisional Application of U.S. patent application Ser. No. 15/746,337 filed Jan. 19, 2018, which is a U.S. National Stage Application of International Application No. PCT/US2016/030971 filed May 5, 2016, which designates the United States, and claims priority to U.S. Provisional Application No. 62/207,266 filed Aug. 19, 2015, which are incorporated herein by reference in their entirety.

TECHNICAL FIELD

The present disclosure relates generally to downhole electrocrushing drilling and, more particularly, to high power capacitors suitable for use in downhole electrocrushing drilling.

BACKGROUND

Electrocrushing drilling uses pulsed power technology to drill a borehole in a rock formation. Pulsed power technology repeatedly applies a high electric potential across the electrodes of an electrocrushing drill bit, which ultimately causes the adjacent rock to fracture. The fractured rock is carried away from the bit by drilling fluid and the bit advances downhole.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Electrocrushing drilling may be used to form wellbores in subterranean rock formations for recovering hydrocarbons, such as oil and gas, from these formations. Electrocrushing drilling uses pulsed-power technology to fracture the rock formation by repeatedly delivering high-energy electrical pulses to the rock formation. In some applications, certain components of a pulsed-power system may be located downhole. For example, a pulse-generating circuit may be located in a bottom-hole assembly (BHA) near the electrocrushing drill bit. The pulse-generating circuit may include one or more capacitors that utilize a dielectric composite including nanoparticles in a polymer matrix. The dielectric composite provides a high dielectric constant and is capable of withstanding the high voltages and the harsh environment of a downhole pulsed-power system. The dielectric composite maintains a stable dielectric constant over a wide temperature range (for example, from 10 to 150 degrees Centigrade or from 10 to 200 degrees Centigrade), and physically withstands the vibration and mechanical shock resulting from the fracturing of rock during downhole electrocrushing drilling. Moreover, the capacitors may include a plurality of fuse protected branches coupled in parallel to each other, which may allow the pulse-generating circuit to continue to operate in the event that one or more branches of the capacitors fail.

There are numerous ways in which a dielectric composite may be implemented in a capacitor for a downhole electrocrushing pulsed-power system. Thus, embodiments of the present disclosure and its advantages are best understood by referring to FIGS. 1 through 8C, where like numbers are used to indicate like and corresponding parts.

Figure 1:
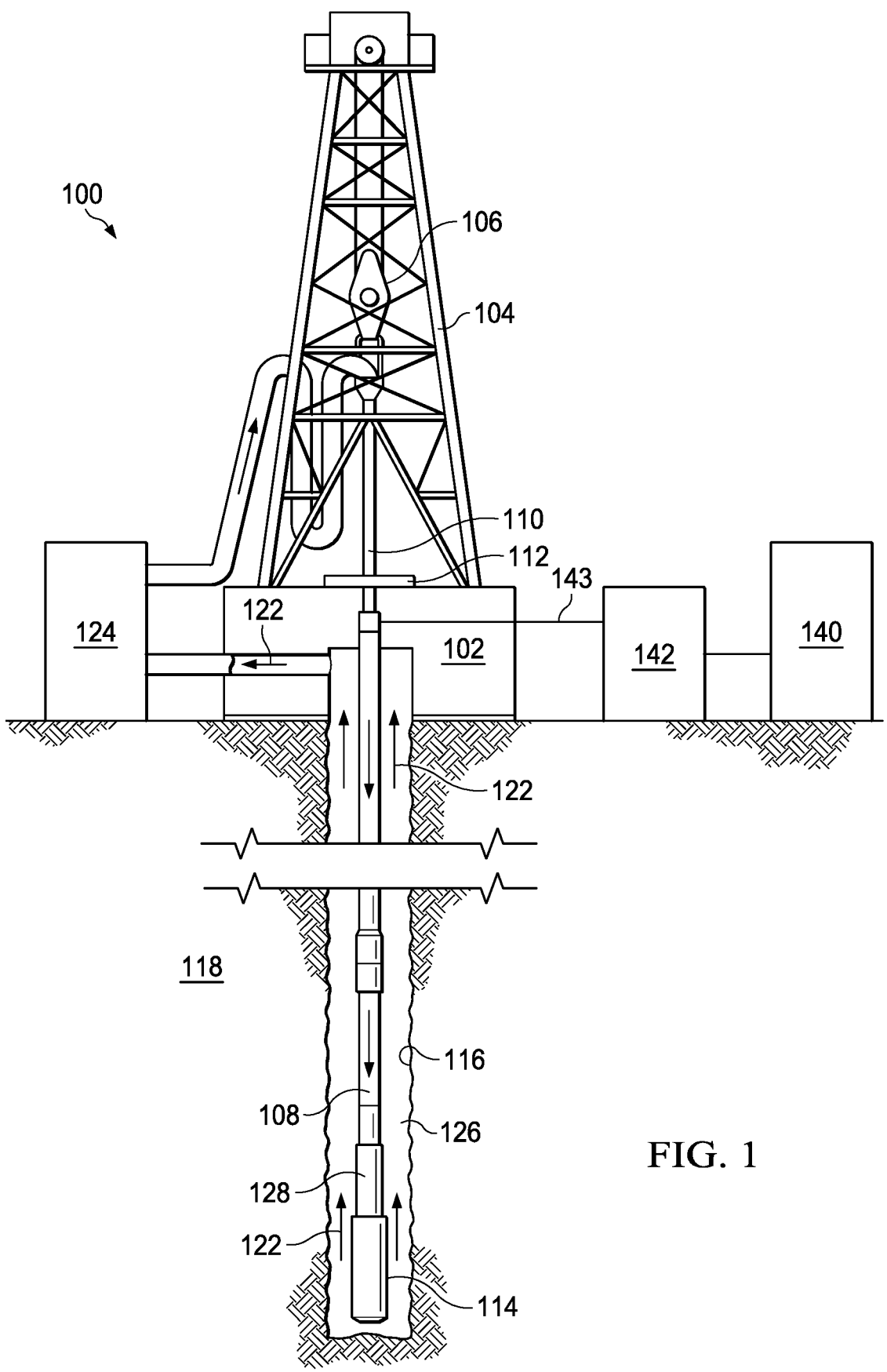
FIG. 1 illustrates an elevation view of an exemplary downhole electrocrushing drilling system used in a wellbore environment.

FIG. 1 is an elevation view of an exemplary electrocrushing drilling system used to form a wellbore in a subterranean formation. Although FIG. 1 shows land-based equipment, downhole tools incorporating teachings of the present disclosure may be satisfactorily used with equipment located on offshore platforms, drill ships, semi-submersibles, and drilling barges (not expressly shown). Additionally, while wellbore 116 is shown as being a generally vertical wellbore, wellbore 116 may be any orientation including generally horizontal, multilateral, or directional.

Drilling system 100 includes drilling platform 102 that supports derrick 104 having traveling block 106 for raising and lowering drill string 108. Drilling system 100 also includes pump 124, which circulates electrocrushing drilling fluid 122 through a feed pipe to drill string 110, which in turn conveys electrocrushing drilling fluid 122 downhole through interior channels of drill string 108 and through one or more orifices in electrocrushing drill bit 114. Electrocrushing drilling fluid 122 then circulates back to the surface via annulus 126 formed between drill string 108 and the sidewalls of wellbore 116. Fractured portions of the formation are carried to the surface by electrocrushing drilling fluid 122 to remove those fractured portions from wellbore 116.

Electrocrushing drill bit 114 is attached to the distal end of drill string 108. In some embodiments, power to electrocrushing drill bit 114 may be supplied from the surface. For example, generator 140 may generate electrical power and provide that power to power-conditioning unit 142. Power-conditioning unit 142 may then transmit electrical energy downhole via surface cable 143 and a sub-surface cable (not expressly shown in FIG. 1) contained within drill string 108 or attached to the side of drill string 108. A pulse-generating circuit within bottom-hole assembly (BHA) 128 may receive the electrical energy from power-conditioning unit 142, and may generate high-energy pulses to drive electrocrushing drill bit 114. The pulse-generating circuit may include one or more capacitors and/or fuse-protected capacitors as described in further detail below with reference to FIGS. 3-8C.

The pulse-generating circuit within BHA 128 may be utilized to repeatedly apply a high electric potential, for example up to or exceeding 150 kV, across the electrodes of electrocrushing drill bit 114. Each application of electric potential may be referred to as a pulse. When the electric potential across the electrodes of electrocrushing drill bit 114 is increased enough during a pulse to generate a sufficiently high electric field, an electrical arc forms through a rock formation at the end of wellbore 116. The arc temporarily forms an electrical coupling between the electrodes of electrocrushing drill bit 114, allowing electric current to flow through the arc inside a portion of the rock formation at an end (such as the bottom) of wellbore 116. This electric current flows until the energy in a given pulse is dissipated. The arc greatly increases the temperature and pressure of the portion of the rock formation through which the arc flows and the surrounding formation and materials. The temperature and pressure is sufficiently high to break the rock into small pieces. The vaporization process creates a high-pressure gas which expands and, in turn, fractures the surrounding rock. This fractured rock is removed, typically by electrocrushing drilling fluid 122, which moves the fractured rock away from the electrodes and uphole.

Wellbore 116, which penetrates various subterranean rock formations 118, is created as electrocrushing drill bit 114 repeatedly fractures the rock formation and electrocrushing drilling fluid 122 moves the fractured rock uphole. Wellbore 116 may be any hole drilled into a subterranean formation or series of subterranean formations for the purpose of exploration or extraction of natural resources such as, for example, hydrocarbons, or for the purpose of injection of fluids such as, for example, water, wastewater, brine, or water mixed with other fluids. Additionally, wellbore 116 may be any hole drilled into a subterranean formation or series of subterranean formations for the purpose of geothermal power generation.

Although drilling system 100 is described herein as utilizing electrocrushing drill bit 114, drilling system 100 may also utilize an electrohydraulic drill bit. An electrohydraulic drill bit may have multiple electrodes similar to electrocrushing drill bit 114. But, rather than generating an arc within the rock, an electrohydraulic drill bit applies a large electrical potential across two electrodes to form an arc across the drilling fluid proximate the bottom of wellbore 116. The high temperature of the arc vaporizes the portion of the fluid immediately surrounding the arc, which in turn generates a high-energy shock wave in the remaining fluid. The electrodes of electrohydraulic drill bit may be oriented such that the shock wave generated by the arc is transmitted toward the bottom of wellbore 116. When the shock wave hits and bounces off of the rock at the bottom of wellbore 116, the rock fractures. Accordingly, drilling system 100 may utilize pulsed-power technology with an electrohydraulic drill bit to drill wellbore 116 in subterranean formation 118 in a similar manner as with electrocrushing drill bit 114.

Figure 2:
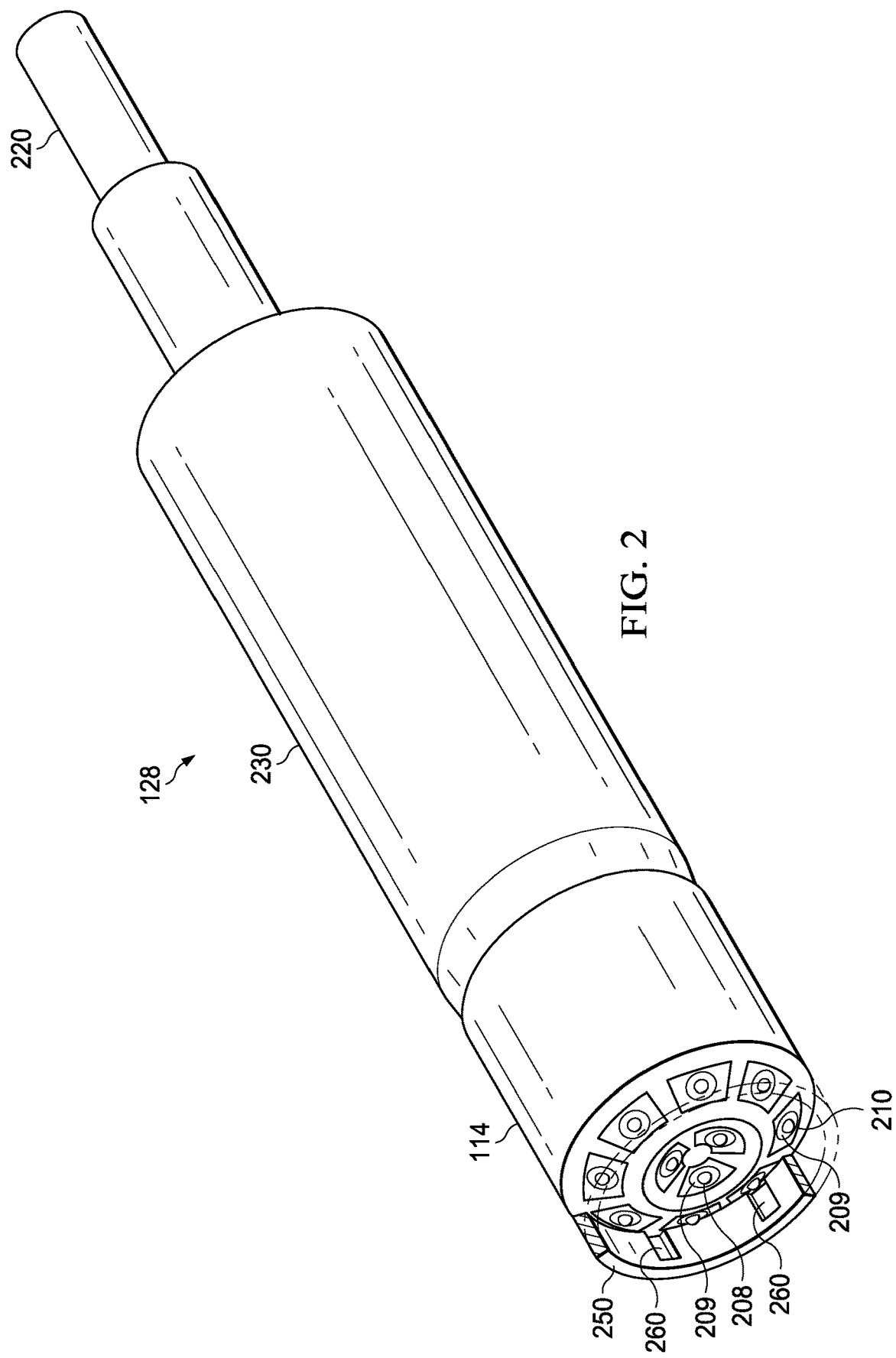
FIG. 2 illustrates exemplary components of a bottom hole assembly for a downhole electrocrushing drilling system.

FIG. 2 illustrates exemplary components of a bottom hole assembly for downhole electrocrushing drilling system 100. Bottom-hole assembly (BHA) 128 may include pulsed-power tool 230. BHA 128 may also include electrocrushing drill bit 114. For the purposes of the present disclosure, electrocrushing drill bit 114 may be referred to as being integrated within BHA 128, or may be referred to as a separate component that is coupled to BHA 128.

Pulsed-power tool 230 may be coupled to provide pulsed power to electrocrushing drill bit 114. Pulsed-power tool 230 receives electrical energy from a power source via cable 220. For example, pulsed-power tool 230 may receive power via cable 220 from a power source on the surface as described above with reference to FIG. 1, or from a power source located downhole such as a generator powered by a mud turbine. Pulsed-power tool 230 may also receive power via a combination of a power source on the surface and a power source located downhole. Pulsed-power tool 230 converts the electrical energy received from the power source into high-power electrical pulses, and may apply those high-power pulses across electrodes of electrocrushing drill bit 114. For the purposes of the present disclosure, ground ring 250 may also be referred to generally as an electrode or more specifically as a ground electrode. In one example, pulsed-power tool 230 may apply the high-power pulses across electrode 208 and ground ring 250 of electrocrushing drill bit 114. Pulsed-power tool 230 may also apply high-power pulses across electrode 210 and ground ring 250 in a similar manner as described herein for electrode 208 and ground ring 250.

Pulsed-power tool 230 may include a pulse-generating circuit as described below with reference to FIG. 3. Such a pulse-generating circuit may include high-power capacitors, which are described below with reference to FIGS. 5A-6, and which may include fuse-protection as described below with reference to FIGS. 7-8C.

Referring to FIG. 1 and FIG. 2, electrocrushing drilling fluid 122 may exit drill string 108 via openings 209 surrounding each electrode 208 and each electrode 210. The flow of electrocrushing drill fluid 122 out of openings 209 allows electrodes 208 and 210 to be insulated by the electrocrushing drilling fluid. In some embodiments, electrocrushing drill bit 114 may include a solid insulator (not expressly shown in FIG. 1 or 2) surrounding electrodes 208 and 210 and one or more orifices (not expressly shown in FIG. 1 or 2) on the face of electrocrushing drill bit 114 through which electrocrushing drilling fluid 122 may exit drill string 108. Such orifices may be simple holes, or they may be nozzles or other shaped features. Because fines are not typically generated during electrocrushing drilling, as opposed to mechanical drilling, electrocrushing drilling fluid 122 may not need to exit the drill bit at as high a pressure as the drilling fluid in mechanical drilling. As a result, nozzles and other features used to increase drilling fluid pressure may not be needed. However, nozzles or other features to increase electrocrushing drilling fluid 122 pressure or to direct electrocrushing drilling fluid may be included for some uses.

Drilling fluid 122 is typically circulated through drilling system 100 at a flow rate sufficient to remove fractured rock from the vicinity of electrocrushing drill bit 114 in sufficient quantities within a sufficient time to allow the drilling operation to proceed downhole at least at a set rate. In addition, electrocrushing drilling fluid 122 may be under sufficient pressure at a location in wellbore 116, particularly a location near a hydrocarbon, gas, water, or other deposit, to prevent a blowout.

Electrodes 208 and 210 may be at least 0.4 inches apart from ground ring 250 at their closest spacing, at least 1 inch apart at their closest spacing, at least 1.5 inches apart at their closest spacing, or at least 2 inches apart at their closest spacing. If drilling system 100 experiences vaporization bubbles in electrocrushing drilling fluid 122 near electrocrushing drill bit 114, the vaporization bubbles may have deleterious effects. For instance, vaporization bubbles near electrodes 208 or 210 may impede formation of the arc in the rock. Electrocrushing drilling fluids 122 may be circulated at a flow rate also sufficient to remove vaporization bubbles from the vicinity of electrocrushing drill bit 114.

In addition, electrocrushing drill bit 114 may include ground ring 250, shown in part in FIG. 2. Although not all electrocrushing drill bits 114 may have ground ring 250, if it is present, it may contain passages 260 to permit the flow of electrocrushing drilling fluid 122 along with any fractured rock or bubbles away from electrodes 208 and 210 and uphole.

Figure 3:
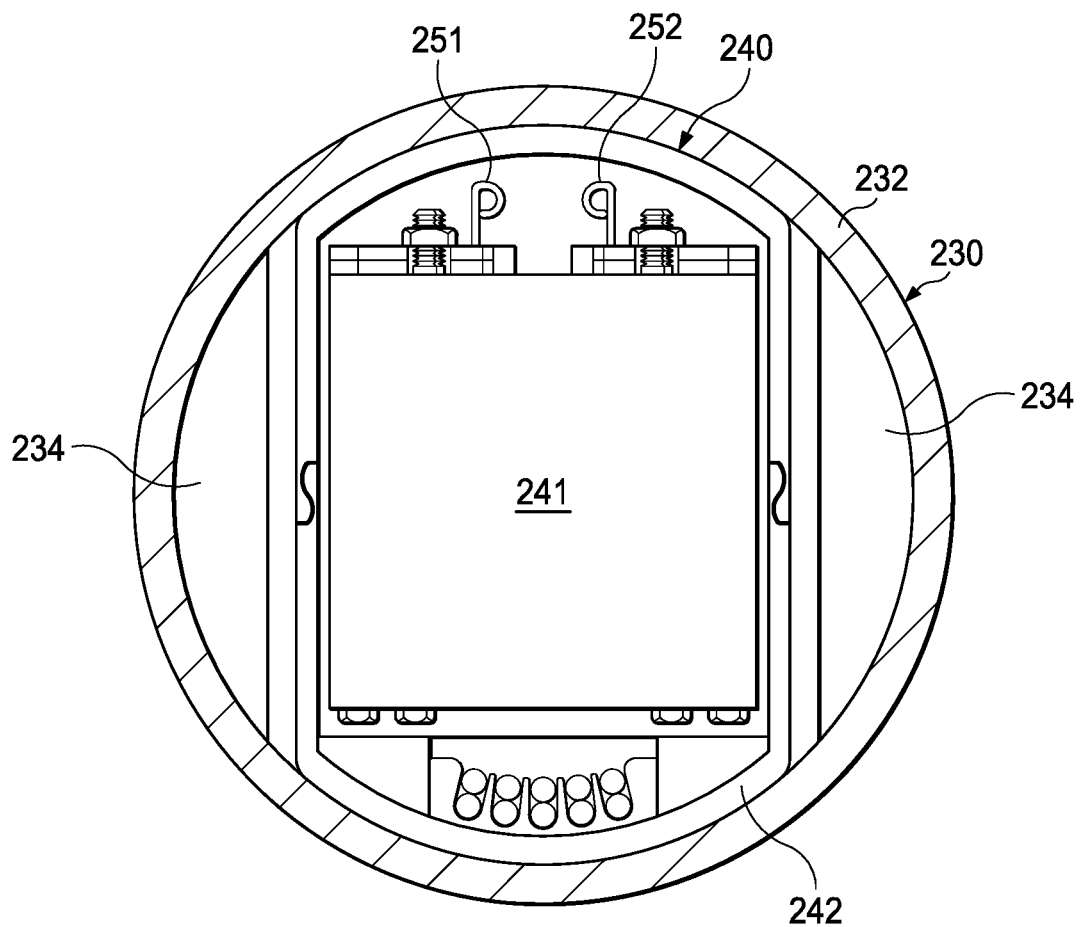
FIG. 3 illustrates a top cross-sectional view of an exemplary pulsed-power tool for a downhole electrocrushing drilling system.

FIG. 3 illustrates a top cross-sectional view of an exemplary pulsed-power tool for a downhole electrocrushing drilling system. Pulsed-power tool 230 includes outer pipe 232, which may form a section of an outer wall of a drill string (for example, drill string 108 illustrated in FIG. 1). Pulsed-power tool 230 also includes capacitor 241 that provides a high-voltage capacitance across terminals 251 and 252.

Capacitor 241 may be implemented as a capacitor in a pulse-generating circuit, such as capacitor 414 of pulse-generating circuit 400 described below with reference to FIG. 4. In such embodiments, terminal 251 may be coupled to electrode 208, terminal 252 may be coupled to ground ring 250, and capacitor 241 may help control the voltage that is applied across electrode 208 and ground ring 250 during electrocrushing drilling in a similar manner as described below for capacitor 414 of FIG. 4. Further, capacitor 241 may be a high-voltage capacitor that is rated for use at voltages up to, for example, 150 kV or more. The dielectric materials forming capacitors, such as capacitor 241, are described in greater detail below with reference to FIGS. 5A-5C.

Capacitor 241 is shaped to fit within the circular cross-section of pulsed-power tool 230. Capacitor 241 is also shaped such that pulsed-power tool 230 may include fluid channels 234. For example, as shown in FIG. 3, capacitor 241 may fit within capacitor housing 240. The outer wall of capacitor housing 240 includes curved portions that align with the inner wall of pipe 232. The outer wall of capacitor housing 240 also includes flattened portions. Accordingly, capacitor 241 may be located adjacent to at least one or more fluid channels within the circular cross-section of pipe 232 of downhole pulsed-power tool 230. Drilling fluid 122 may pass through fluid channels 234 as drilling fluid is pumped down through a drill string as described above with reference to FIG. 1.

Figure 4:
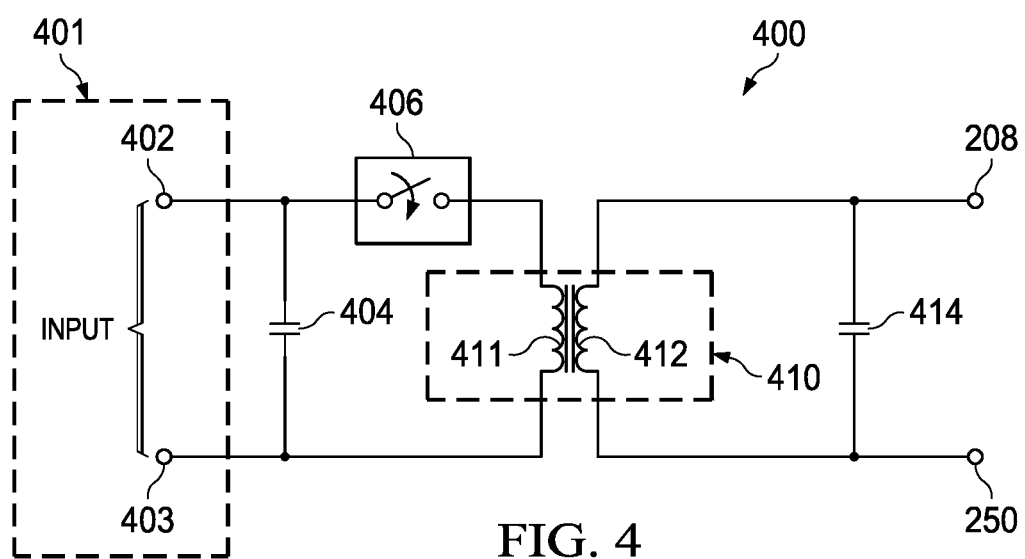
FIG. 4 illustrates a schematic for an exemplary pulse-generating circuit for a downhole electrocrushing drilling system.

FIG. 4 illustrates a schematic for an exemplary pulse-generating circuit for a downhole electrocrushing drilling system. Pulse-generating circuit 400 includes power source input 401, including input nodes 402 and 403, and capacitor 404 coupled between input nodes 402 and 403. Pulse-generating circuit 400 also includes switch 406, transformer 410, and capacitor 414.

Pulse-generating circuit 400 may be implemented within pulsed-power tool 230 of FIG. 2. And as described above with reference to FIG. 2, pulsed-power tool 230 may receive power from a power source on the surface, from a power source located downhole, or from a combination of a power source on the surface and a power source located downhole. The power may be received by pulse-generating circuit 400 at power source input 401. Switch 406 is coupled to power source input 401 and includes any suitable device to open and close the electrical path between power source input 401 and the first winding 411 of transformer 410. For example, switch 406 may include a mechanical switch, a semiconductor switch, a magnetic switch, or any other type of switch suitable to open and close the electrical path between power source input 401 and first winding 411 of transformer 410. Switch 406 is open between pulses and closes at the beginning of a pulse cycle. When switch 406 closes, electrical current flows through first winding 411 of transformer 410. Second winding 412 of transformer 410 is electromagnetically coupled to first winding 411. Accordingly, when switch 406 closes and an electrical current flows through first winding 411, a current also flows through second winding 412. The current through second winding 412 charges capacitor 414, thus increasing the voltage across capacitor 414.

Electrode 208 and ground ring 250 of a drill bit (for example, electrocrushing drill bit 114 illustrated in FIGS. 1 and 2) may be coupled to opposing terminals of capacitor 414. As the voltage across capacitor 414 increases, the voltage across electrode 208 and ground ring 250 also increases. Moreover, the rate at which the voltage across electrode 208 and ground ring 250 increases is a function of the capacitance value of capacitor 414. And, as described above with reference to FIG. 1, when the voltage across the electrodes of an electrocrushing drill bit becomes sufficiently large, an arc forms through a rock formation that is in contact with electrode 208 and ground ring 250. The arc provides a temporary electrical short between electrode 208 and ground ring 250, and thus discharges, at a high current level, the voltage built up across capacitor 414. As described above with reference to FIG. 1, the arc greatly increases the temperature of the portion of the rock formation through which the arc flows and the surrounding formation and materials. The temperature is sufficiently high to vaporize any water or other fluids that might be touching or near the arc and may also vaporize part of the rock itself. The vaporization process creates a high-pressure gas which expands and, in turn, fractures the surrounding rock.

Although FIG. 4 illustrates a schematic for a particular pulse-generating circuit topology, electrocrushing drilling systems and pulsed-power tools may utilize any suitable pulse-generating circuit topology to generate and apply high-voltage pulses across electrode 208 and ground ring 250. Moreover, although FIG. 4 illustrates capacitor 404 and capacitor 414 implemented within a particular pulse-generating circuit 400, the capacitors described herein may be utilized within any other type of pulse-generating circuit, within any other pulsed-power tool, or within any other suitable application implementing high-voltage capacitors. As described below with reference to FIGS. 5A-5C, the capacitors described herein may utilize dielectric materials that withstand high voltages (for example, up to 30 kV), and that withstand high temperatures (for example, up to 150 degrees Centigrade). Thus, the capacitors described herein may be suitable for use within other downhole pulsed-power applications that required a stable capacitance value at high voltages and across a large temperature range.

Further, although capacitor 404 and capacitor 414 are each illustrated in FIG. 4 as a single capacitor, such capacitors may be implemented by multiple capacitors coupled in series and/or multiple capacitors coupled in parallel with each other. For example, as described below with reference to FIG. 7, multiple individual capacitors may be placed in parallel to form a single capacitor array with a capacitance approximately equal to the sum of the multiple individual capacitors. Further, multiple capacitors may be coupled in series to increase the total voltage rating of the capacitors. For example, five capacitors that each withstand a voltage up to 30 kV may be placed in series to provide a capacitance that withstands up to 150 kV.

Figure 5A:
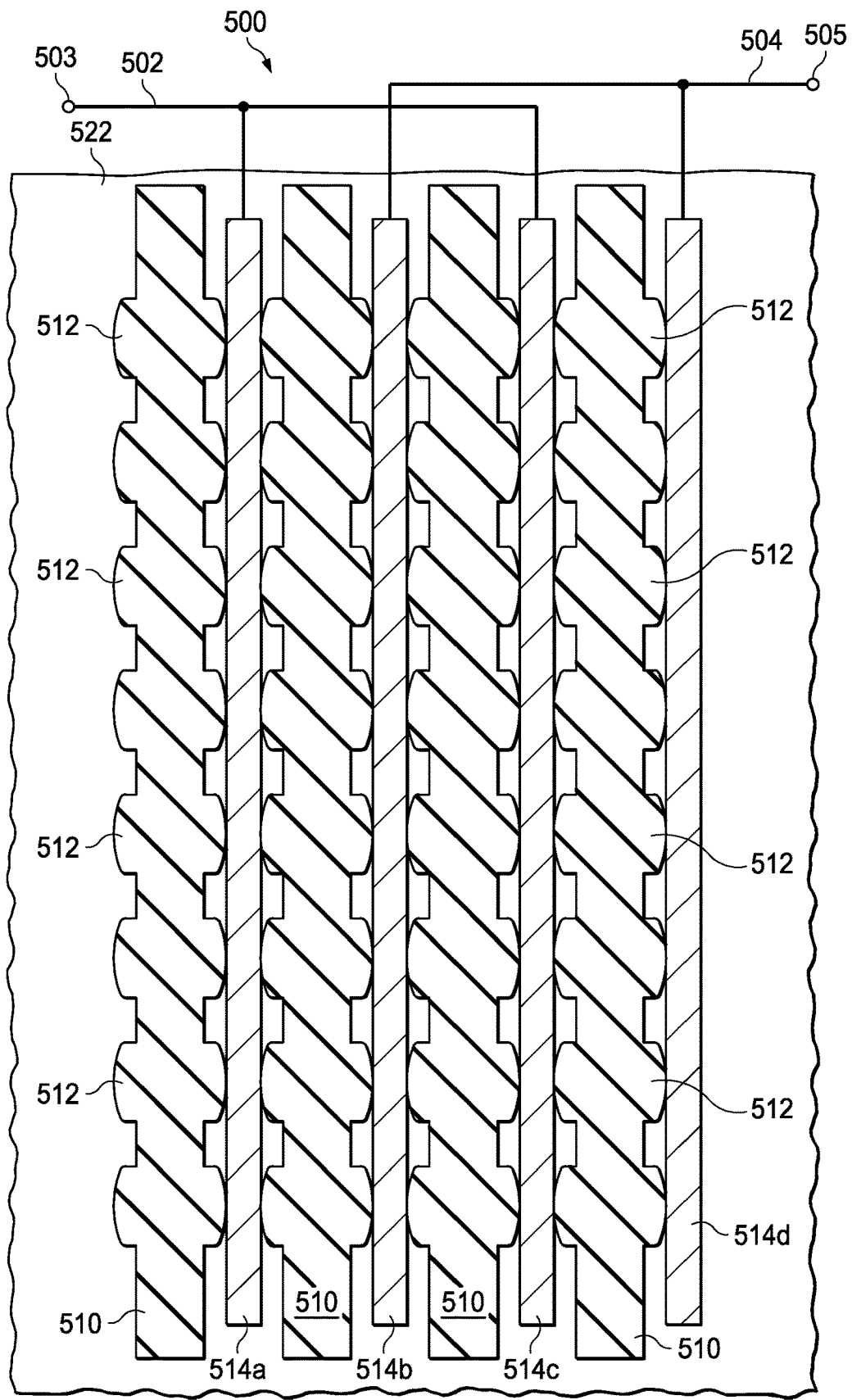
FIG. 5A illustrates a side-facing view of components of an exemplary high-voltage, high-power capacitor for a downhole electrocrushing drilling system.

FIG. 5A illustrates a side-facing view of components of an exemplary high-voltage, high-power capacitor for a downhole electrocrushing drilling system. Capacitor 500 may be implemented, for example, in a pulse-generating circuit such as pulse-generating circuit 400 described above with reference to FIG. 4. As shown in FIG. 5A, capacitor 500 includes a plurality of dielectric sheets 510, a plurality of spacers 512 disposed on each side of each dielectric sheet 510, and a plurality of electrode sheets 514. The plurality of electrode sheets 514 is interleaved with the plurality of dielectric sheets 510.

Further, conductor 502 couples every other electrode sheet 514 (for example, electrode sheets 514a and 514c) to terminal 503, and conductor 504 couples the other electrode sheets 514 (for example, electrode sheets 514b and 514d) to terminal 505. The interleaving of dielectric sheets 510 and electrode sheets 514 provides a summation of dielectric sheet capacitance between terminals 503 and 505 of capacitor 500 when every other electrode sheet 514 is coupled together. For example, coupling electrode sheet 514a and electrode sheet 514c together provides a summation of (i) the capacitance between electrode sheet 514a and electrode sheet 514b, and (ii) the capacitance between electrode sheet 514b and electrode sheet 514c. Electrode sheets 514 may also be coupled in a manner that places the capacitances provided between the respective electrode sheets in series, thus increasing the voltage capability of capacitor 500.

The capacitance of capacitor 500 depends on the dielectric constant of dielectric sheets 510. The dielectric constant of dielectric sheets 510 indicates the ability of the sheets to store electrical energy when exposed to an electric field. The dielectric constant of dielectric sheets 510 may be at least 3, at least 10, or at least 20, from 0.1 Hz to 1.0 MHz frequency, and at temperatures experienced downhole and during use of electrocrushing drill bit 114, such as temperatures from 10 degrees Centigrade up to 200 degrees Centigrade. For example, the dielectric constant of dielectric sheets 510 may be at least 3, at least 10, or at least 20, at 0.1 kHz frequency, and at 150 degrees Centigrade. As another example, the dielectric constant of dielectric sheets 510 may be at least 3, at least 10, or at least 20, at 100 kHz frequency, and at 200 degrees Centigrade. As yet another example, the dielectric constant of dielectric sheets 510 may be at least 3, at least 10, or at least 20, at 1 MHz frequency, and at 150 degrees Centigrade. Expressed alternatively, the dielectric constant may provide capacitor 500 with a storage density of, for example, at least 0.05 Joules per cubic inch (J/in$^3$) or at least 0.5 J/in$^3$. The high storage density allows capacitor 500 to provide a large capacitance in a small amount of space. Thus, capacitor 500 may be utilized to provide a large capacitance in a downhole environment where space is limited, such as in downhole pulsed-power tool 230 depicted in FIGS. 2 and 3.

The capacitance or other discharge properties of capacitor 500 may also depend upon the dielectric strength of dielectric sheets 510. The dielectric strength indicates the electric field or voltage to which dielectric sheet 510 may be exposed before experiencing electrical breakdown. The dielectric strength of dielectric sheets 510 may be, for example, at least 300 kV/cm, at least 330 kV/cm, at least 350 kV/cm, or at least 400 kV/cm at 10 microseconds rise time. Expressed alternatively, the dielectric strength may allow capacitor 500 to resist failure at charges of, for example, at least 20 kV, at least 25 kV, or at least 30 kV. Expressed still another way, the dielectric strength may be sufficient to allow capacitor 500 to be used for at least $10^7$ or at least $10^9$ charge/discharge cycles in a pulse-generating circuit, similar to capacitor 414 depicted in pulse-generating circuit 400 of FIG. 4.

It is also useful for dielectric sheets 510 to be sufficiently temperature-resistant to not undergo degradation or experience other temperature-related negative effects at temperatures experienced downhole and during use of electrocrushing drill bit 114. For instance, dielectric sheets may have a stable dielectric constant (varying less than 1%) between 10 and 150 degrees Centigrade, or between 10 and 200 degrees Centigrade, at a voltage of at least 30 kV. Accordingly, capacitor 500 may maintain a stable capacitance value at high voltage over the wide range of temperatures experienced in the downhole environment.

It is further useful for dielectric sheets 510 to be elastic, particularly as compared to materials that on their own possess a sufficient dielectric constant, such as the ferroelectric materials described below. For example, dielectric sheets 510 may have a Young's modulus of 0.05 GPa or less, or 0.01 GPa or less. Express another way dielectric sheets 510 may have sufficient material strength to allow capacitor 500 to withstand pressures of at least range of at least 10,000 pounds-per-square-inch (psi), at least 15,000 psi, or between 10,000 and 15,000 psi. Moreover, dielectric sheets 510 may help capacitor 500 to withstand the physical shock and vibrations that result from the repeated fracturing of subterranean rock during the drilling of a wellbore with the electrocrushing drill bit.

Although a single material that exhibits sufficient dielectric constant, dielectric strength, elasticity, and temperature-resistance may form dielectric sheets 510, single materials with this appropriate combination of properties are not common. As a result, dielectric sheets may also be formed from composite materials in which one component contributes positively to one property, and another component contributes positively to another property. For instance, a simple composite material may include a matrix that provides the desired physical properties (for example, strength and elasticity) and homogeneously dispersed particles to increase the dielectric constant. This increase in dielectric constant is proportional to the stored energy of the capacitor and inversely proportional to size of the capacitor for a given energy. As an example, a capacitor produced for a given energy with a composite material with a dielectric constant of 15 may be five times smaller than a capacitor produced with the matrix material alone with a typical dielectric constant of 3. Relative to the application, a single material such as the matrix alone may not be practical due to energy requirements and size limitations. More complex composite materials may include a plurality of components to contribute different positive properties. The relative proportions or total amounts of components may be determined by the minimal and maximal proportions or total amounts that provide a dielectric constant, dielectric strength, elasticity, or temperature-resistance for the composite material as a whole.

In addition, the physical form of the composite material and its components may be determined by the nature of the components as well as the dielectric constant, dielectric strength, elasticity, or temperature-resistance for the composite material as a whole. Using the example above, particles embedded in a matrix may help retain the particles if they are otherwise chemically reactive, melt at downhole temperatures, or are otherwise subject to loss from the composite material. The components of the composite material may be present in other arrangements that are physically distinct on a macroscopic level, such as sheets. Using a different example, the composite material may include a blend of components such that, unlike particles in a matrix, they are not physically distinct on a macroscopic level. Such a composite material may exhibit a higher dielectric strength because of its uniformity.

Silicone and carbon polymers have a high elasticity and are thermally stable at temperatures experienced downhole and during use of electrocrushing drill bit 114. These materials are also relatively cheap and safe. Thus, they may be used as a component of the composite material. Silicone and carbon polymers are also well suited to forming certain macroscopic physical structures, such as a matrix or sheets.

Silicone polymers used herein may have a backbone formed of repeating silicon-oxygen (S—O) monomer units. These silicon polymers may also have substituent (R) groups. In general, the silicone polymers may have the structural formula:

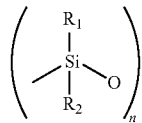

n may be any integer. For instance, n may be at least 10, at least 50, at least 100, at least 500, at least 1000, or at least 5000. n may be 10,000 or less, 5,000 or less, 1,000 or less, 500 or less, 100 or less, or 50 or less. n may also be between any of these endpoints.

One or both of $R_1$ and $R_2$ may be absent. If both present, $R_1$ and $R_2$ may be the same substituent or different substituents. $R_1$ or $R_2$ may be H, a carbon (C) containing group such as an aryl, or alkyl group, such as a single or branched polymer, a nitrogen (N)-containing group, such as an amine or imine, an oxygen (O)-containing group, such as a hydroxyl group, a halogen-containing group, or a Si-containing group, such as a siloxane or a further silicone to form a branched polymer.

In addition, the silicone polymers may contain the same repeating monomer unit, or they may contain at least two or a plurality of different monomer units which may repeat in sequences or randomly.

Carbon polymers used herein may have a backbone formed of repeating carbon monomer units with the general structural formula:

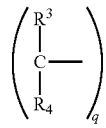

q may be any integer. For instance, q may be at least 10, at least 50, at least 100, at least 500, at least 1000, or at least 5000. q may be 10,000 or less, 5,000 or less, 1,000 or less, 500 or less, 100 or less, or 50 or less. q may also be between any of these endpoints.

One or both of $R_3$ and $R_4$ may be absent. If both present, $R_1$ and $R_2$ may be the same substituent or different substituents. $R_3$ and $R_4$ may be H, a C containing group such as an aryl, or alkyl group, such as a single or branched polymer, an N-containing group, such as an amine or imine, an O-containing group, such as a hydroxyl group, a halogen-containing group, or a Si-containing group, such as a silicone or siloxane. In addition, the carbon polymers may contain the same repeating monomer unit, or they may contain at least two or a plurality of different monomer units which may repeat in sequences or randomly.

Carbon polymers used herein may also have a backbone formed of repeating carbon-oxygen (C—O) monomer units. These silicon polymers may also have substituent (R) groups. In general, the silicone polymers may have the structural formula:

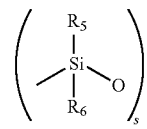

s may be any integer. For instance, s may be at least 10, at least 50, at least 100, at least 500, at least 1000, or at least 5000. s may be 10,000 or less, 5,000 or less, 1,000 or less, 500 or less, 100 or less, or 50 or less. s may also be between any of these endpoints.

One or both of $R_5$ and $R_6$ may be absent. If both present, R $R_5$ and $R_6$ may be the same substituent or different substituents. $R_5$ and $R_6$ may be H, a C containing group such as an aryl, or alkyl group, such as a single or branched polymer, an N-containing group, such as an amine or imine, an O-containing group, such as a hydroxyl group, a halogen-containing group, or a Si-containing group, such as a siloxane or silicone.

In addition, the carbon polymers may contain the same repeating monomer unit, or they may contain at least two or a plurality of different monomer units which may repeat in sequences or randomly.

Hybrid polymers containing a mixture of any of the silicone, carbon, or carbon-oxygen monomers may also be used. These hybrid polymers may repeat different monomer units in sequences or randomly.

Furthermore, the composite material may contain a blend of one or more polymers described above to form a homogenous or heterogeneous polymer matrix.

Silicone polymers, silicone-containing hybrid polymers, or composite materials with blends of polymers including silicone polymers or silicone containing—hybrid polymers may provide greater elasticity than pure carbon polymers.

Polymers as described above may form a polymer matrix simply upon setting from a liquid state, or through crosslinking. Crosslinking may occur due to chemical reaction of separate polymers with one another, such as via a condensation or addition reaction, or it may be facilitated by the use of a chemical crosslinking agent, which may chemically react with the polymers or catalyze their chemical reaction, for example by producing free radicals. Crosslinking may also be facilitated by factors that cause the polymers to chemically react with one another or with a crosslinking agent; such factors may include electromagnetic radiation, such as light, ultraviolet light, or infrared radiation. Such factors may also include heat.

It is further possible for a combination of monomers to both form polymers and the polymer matrix simultaneously while undergoing a polymerization reaction.

Other components of the composite material may be present while the polymers are forming the polymer matrix, even when they polymer matrix is formed at the same time as polymerization. This may allow the other components of the composite material to be more homogenously distributed within the composite material.

Substituent (R) groups for the silicone and carbon polymers may help increase the dielectric constant or dielectric strength of these components, but many silicone and carbon polymers have a dielectric constant of less than 6 and are thus not suitable for use alone in dielectric sheets 510. Another component with a high dielectric constant may be added to increase the dielectric constant of the composite material. In addition, the dielectric strength of some silicone and carbon polymers may be too low for dielectric sheets 510. In that case, another component may be added to increase the dialectic strength of the composite material. A single component may be added to increase both dielectric constant and dielectric strength, or a plurality of components may be used. In addition, more than one component may contribute a given property. For instance, two components may be used even when both contribute to dielectric strength.

Suitable components for increasing the dielectric constant of the composite material include a component with a dielectric constant of at least 30, at least 50, at least 100, at least 500, at least 1000, at least 5000, or at least 10,000, at 0.1 Hz to 1.0 MHz frequency, and at temperatures up to 150 degrees Centigrade. Such suitable components include a ferroelectric component, such as barium titanate, strontium titanate, barium neodymium titanate, barium strontium titanate, magnesium zirconate, titanium dioxide, calcium titanate, barium magnesium titanate, lead zirconium titanium, and any combinations thereof.

When crystalline components are used, they may have a particular crystal structure, which may affect one or more of the properties of dielectric sheets 510. The crystal structure within the particles allows for the electronic polarization and increased energy storage capability, observed as a high dielectric constant. The crystal structure and polarization behavior of the particles may also depend on, for example, particle size and temperature. A change in crystal structure may result in a non-linear temperature coefficient of capacitance associated with a changing dielectric constant. In the case of barium titanate, larger particles (for example, greater than 1.0 micron) may experience a phase transition from tetragonal to cubic crystal structure around 125 degrees Centigrade. Approaching this transition, the dielectric constant of the crystal component can change by a factor of five to ten, which results in a change in the composite material's dielectric strength. Alternatively, barium titanate nanoparticles (for example, less than 0.5 microns) have a cubic structure throughout the temperature range experienced by the composite material during use (for example, from 10 degrees to 150 degrees Centigrade), and thus may experience no significant change in dielectric constant.

When the composite includes at least one component in the form of particles, it may be in the form microparticles (for example, particles with an average diameter of 1 μm to 999 μm), or nanoparticles (for example, particles with an average diameter of 1 nm to 999 nm). Nanoparticles may allow more uniform dispersal within the composite material. For instance, they allow more uniform dispersal within a polymer matrix as described above. In addition to the stable dielectric constant versus temperature described above, the nanoparticles do not represent point defects that can have a detrimental impact on the mechanical and electrical properties of the composite material. Microparticles can represent asperities in a composite material that initiate mechanical failure such as low tensile strength. Similarly, microparticles can represent voltage enhancement sites in composites which can initiate ionization and low dielectric breakdown strength. Failure initiates and propagates along the large boundary layer between the matrix and surface of the microparticles. In the case of nanoparticles, boundary layer distances are minimized and the composite material behaves closer to a single phase material. The adverse impact on mechanical and electrical properties of the matrix is minimized in the composite through the use of nanoparticles.

In one example, dielectric sheet 510 may be formed from a composite material including a silicone polymer matrix with between 10% and 60% by volume embedded ferroelectric nanoparticles, such as barium titanate nanoparticles or strontium titanate nanoparticles. The example ferroelectric component nanoparticles may have an average diameter of 20 nm to 150 nm, from 40 nm to 60 nm, or of 50 nm.

Dielectric sheets 510 may be shaped to isolate electrode sheets 514a and 514c coupled to terminal 503 from electrode sheets 514b and 514d coupled to terminal 505. For example, as shown in both FIG. 5A and FIG. 5B, the ends of dielectric sheet 510 extend past the ends of electrode sheets 514. Accordingly, dielectric sheets 510 prevent electrical arcs from forming between electrode sheets 514a and 514c coupled to terminal 503 and electrode sheets 514b and 514d coupled to terminal 505 when a large voltage potential (for example, up to 30 kV) is applied across terminals 503 and 505 of capacitor 500.

Capacitor 500 also utilizes dielectric encapsulant 522 to insulate electrode sheets 514 from each other. For example, capacitor 500 includes spacers 512 located on each of dielectric sheets 510. Spacers 512 may include material that is placed on dielectric sheet 510 but is otherwise distinct from dielectric sheet 510. Spacers 512 may also be an integral part of dielectric sheet 510 including, but not limited to, protrusions of a textured surface of dielectric sheet 510. In addition, spacers 512 may include a combination of material distinct from dielectric sheet 510 and material that is an integral part of dielectric sheet 510. Dielectric encapsulant 522 fills the space provided by spacers 512 between electrode sheets 514 and dielectric sheets 510. Dielectric encapsulant 522 also surrounds each instance of electrode sheet 514 and dielectric sheet 510. Dielectric encapsulant 522 may include a fluid dielectric material that surrounds the edges of each electrode sheet 514 and each dielectric sheet 510, as well as fill the spaces between each electrode sheet 514 and dielectric sheet 510.

Dielectric encapsulant 522 may include the same or similar polymer/nanoparticle composition as dielectric sheets 510. In some embodiments, dielectric encapsulant 522 may have a dielectric constant similar to the dielectric sheets 510 but may be modified with a conductive or semi-conductive particulate filler, which may cause dielectric encapsulant 522 to have resistance that is lower than the resistance of dielectric sheets 510. Accordingly, dielectric encapsulant 522 may reduce the electric field between two adjacent electrode sheets 514, and thus protect capacitor 500 from failure when a large voltage potential (for example, up to 30 kV) is placed across terminals 503 and 505. The lower resistance of the dielectric encapsulant 522 increases the charge dissipation and reduces the electrical field enhancement at the electrode ends such that dielectric encapsulant 522 may protect capacitor 500 against a voltage breakdown of dielectric sheets 510 near the edges of electrode sheets 514. Further features of capacitor 500 that may protect capacitor 500 from failure when a large voltage potential (for example, up to 30 kV) is placed across terminals 503 and 505 are discussed below with reference to FIG. 5B.

Figure 5B:
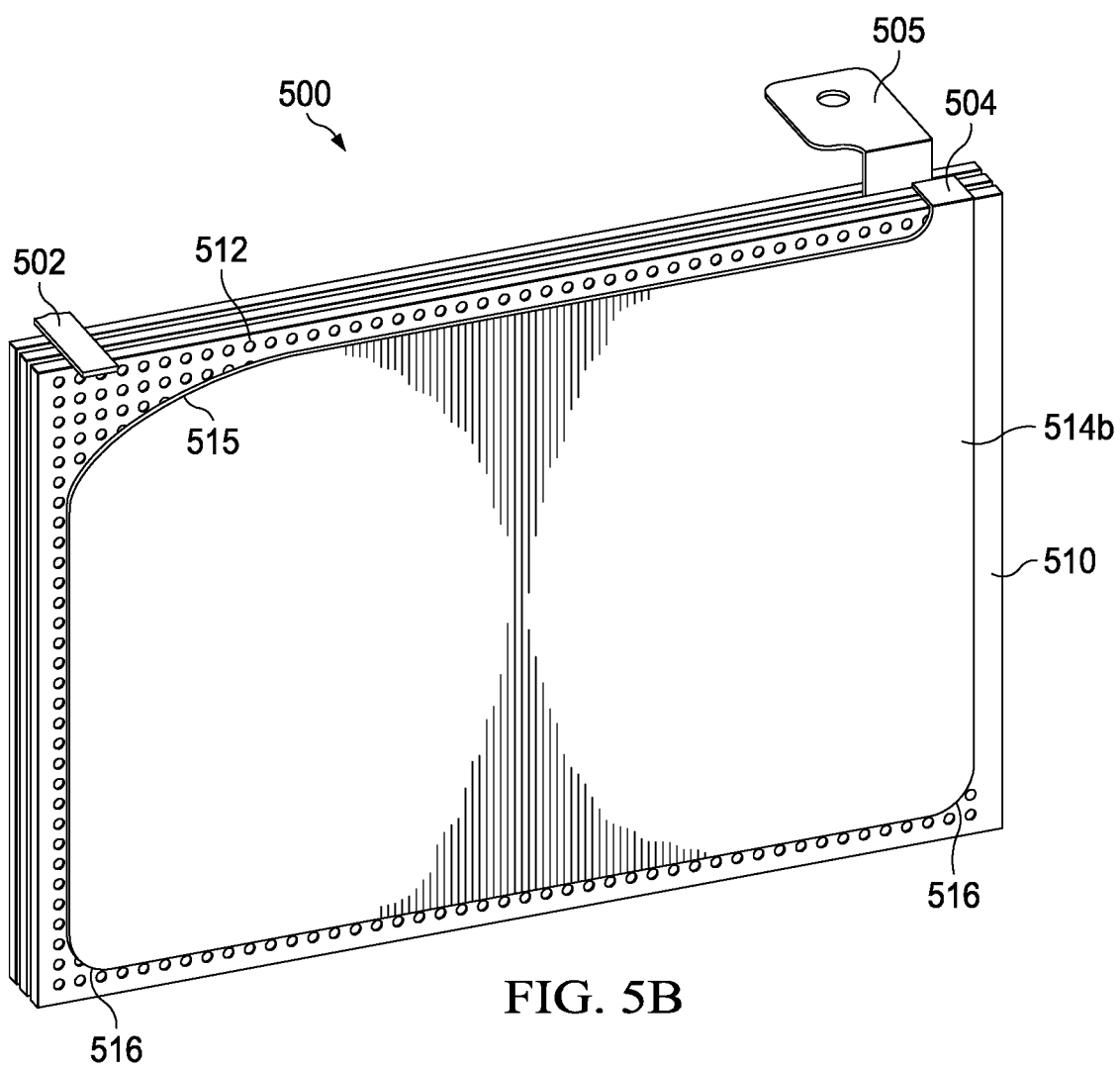
FIG. 5B illustrates an exploded front-facing view of components of an exemplary high-voltage, high-power capacitor for a downhole electrocrushing drilling system.

FIG. 5B illustrates an exploded front-facing view of components of an exemplary high-power, high-voltage, capacitor for a downhole electrocrushing drilling system. The exploded view in FIG. 5B shows an example instance of electrode sheet 514b. Electrode sheet 514b may be formed of any suitable conductive material. For example, electrode sheet 514b may be formed of copper, aluminum, steel, or any other suitable electrically conductive metal or metal compound.

As shown in the exploded front-facing view of FIG. 5B, electrode sheet 514b is smaller than dielectric sheet 510, and is located such that the edges of dielectric sheet 510 extend beyond the edges of electrode sheet 514b. As such, dielectric sheet 510 isolates electrode sheet 514b on one side of dielectric sheet 510 from an opposing instance of electrode sheet 514b on the other side of dielectric sheet 510.

Electrode sheet 514b illustrated in FIG. 5B is coupled to terminal 505 via conductor 504. Electrode sheet 514b may be isolated from conductor 502 and terminal 503. For example, electrode sheet 514b in FIG. 5B includes curve 415 to ensure a minimum distance between electrode sheet 514b and conductor 502. Likewise, electrode sheets coupled to terminal 503 via conductor 502 (such as electrode sheets 514a and 514c shown in FIG. 5A) may include a curve to ensure a minimum distance to conductor 504. The distance, provided by the curve, between electrode sheets 514b and the opposing conductors may prevent an electrical arc from forming between those electrode sheets and the opposing conductors when a large voltage potential (for example, up to 30 kV) is placed across terminals 503 and 505, thus preventing failure of capacitor 500.

Electrode sheet 514 may also include rounded edges 516. The use of rounded edges 516 in place of, for example, ninety-degree corners, reduces the electric field enhancements that may otherwise exist at a corner of electrode sheet 514. Rounded edges 516 may prevent punctures through dielectric sheet 510 that may result from electric field enhancements when large voltage potentials are placed across terminals 503 and 505.

Although FIG. 5B shows rounded edges 516 having a rounded shape, electrode sheet 514 may include edges with any combination of curves and/or obtuse angles to prevent or lower potentially harmful electric field enhancements.

Figure 5C:
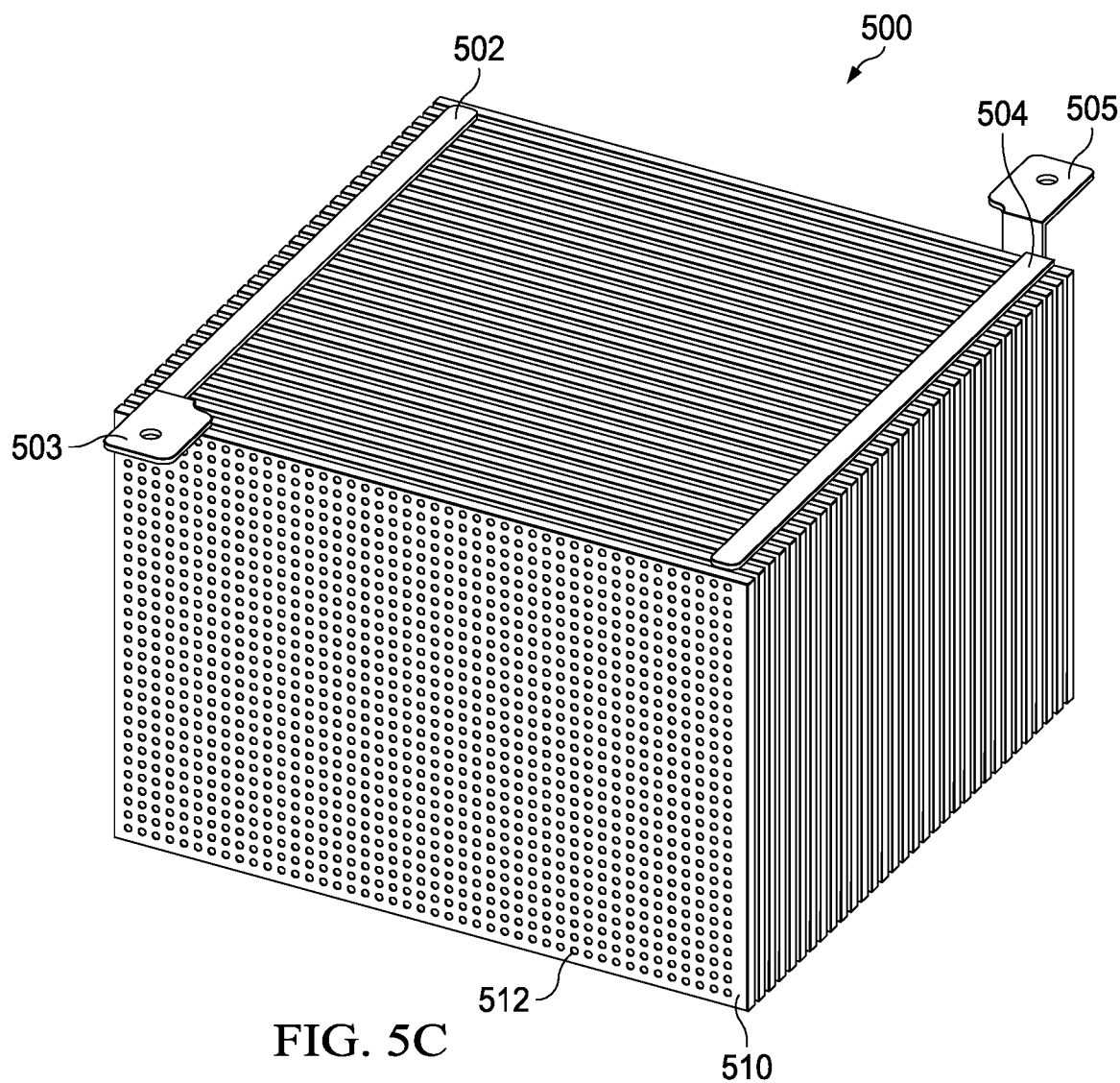
FIG. 5C illustrates a composite view of components of the exemplary high-voltage, high-power capacitor, shown in part in FIGS. 5A and 5B, for a downhole electrocrushing drilling system.

FIG. 5C illustrates a composite view of components of the exemplary high-voltage, high-power capacitor, shown in part in FIGS. 5A and 5B, for a downhole electrocrushing drilling system. As described above with reference to FIG. 5A, a plurality of electrode sheets 514 (not expressly shown in the view of FIG. 5C) are interleaved between a plurality of dielectric sheets 510. As also described above with reference to FIG. 5A, every other electrode sheet may couple to terminal 503 via conductor 502, while opposing electrode sheets 514 may couple to terminal 505 via conductor 504. Accordingly, capacitor 500 may provide a capacitance between terminals 503 and 505.

The plurality of dielectric sheets 510 and electrode sheets 514 may be placed together in a square or rectangular shape. Such a square or rectangular shape may be sized to fit within the limited space of a downhole tool. For example, capacitor 500 may be sized to fit within the dimensions of downhole pulsed-power tool 230, similar to capacitor 241 shown in FIG. 4. The plurality of dielectric sheets 510 and electrode sheets 514 may also be placed together in a shape having curved or non-rectangular sides to fit within corresponding curved or non-rectangular dimensions of downhole pulsed-power tools.

Figure 6:
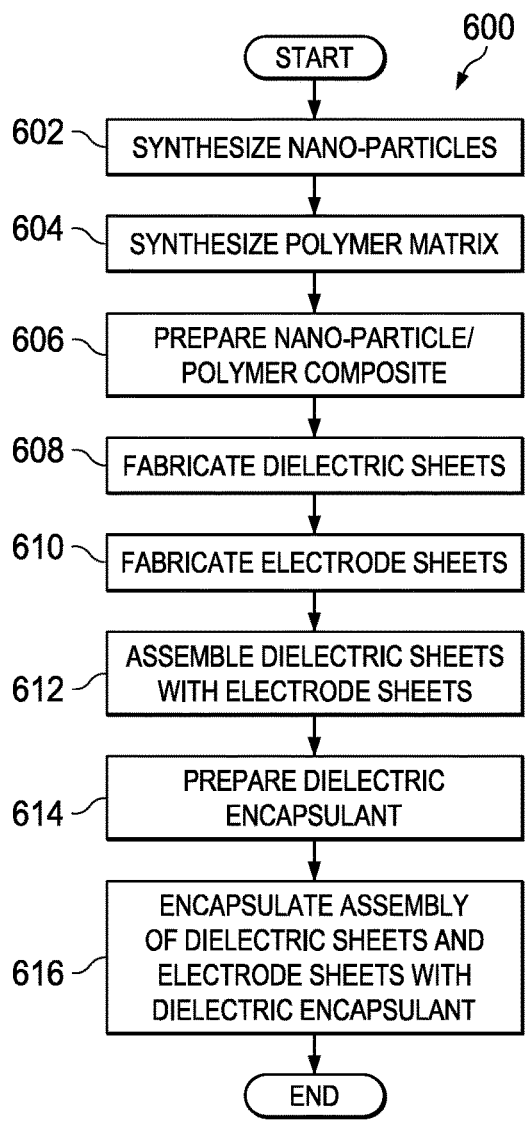
FIG. 6 illustrates a flow chart of an example method for manufacturing a high-voltage, high-power capacitor.

FIG. 6 illustrates a flow chart of an example method for manufacturing a high voltage, high-power capacitor. Although method 600 describes an exemplary process for forming a high-voltage, high-power capacitor such as capacitor 500 of FIGS. 5A-5C, method 600 may also be utilized to form other capacitors. Furthermore, method 600 may be adapted for other composite materials, such as composite materials including microparticles.

Method 600 starts and proceeds to step 602, during which nanoparticles are prepared. Nanoparticles may be formed by chemical reaction of reagents, or by processing larger-sized samples of their constituent materials. For instance, nanoparticles of a ferroelectric component may be prepared by grinding larger samples of the constituent material in a nanogrinder. Nanoparticles may also be prepared by dissolving the constituent material in a solvent or allow a chemical reaction that forms the constituent material to proceed in a solvent, then precipitating the ferroelectric component as nanoparticles. Other low-temperature processes, such as non-refractory processes may also be used.

In step 604, at least one polymer component is formed by polymerization of suitable monomers. Monomers may have particular substituents, or the polymer may be subjected to further chemical reactions to add, remove, or modify substituents after polymerization.

At step 606, the polymer component and nanoparticle component are mixed in appropriate proportions.

At step 608, the mixture of polymer component and nanoparticle component are cast into dielectric sheets and crosslinked, so that a polymer matrix with embedded nanoparticles is formed. The dielectric sheets may be cast into a mold or simply formed by pouring the mixture of polymer component and nanoparticle component onto a surface. Any chemical crosslinking agents may be added at this time, typically prior to casting. If heat or electromagnetic radiation induce crosslinking to form the polymer matrix, they may be applied to the cast mixture. The dielectric sheets may then finished, if needed. For instance, they may be cut to form dielectric sheets 510 described above with reference to FIGS. 5A-5C.

Steps 604, 606, and 608 may be combined for polymers that polymerize and form a polymer matrix simultaneously.

At step 610, electrode sheets are formed from a conductive material. For example, electrode sheets 514 described above with reference to FIGS. 5A-5C may be formed by rolling a metal or metal alloy, such as copper, aluminum, or steel, to form a thin sheet or foil. If the conductive material is not sufficiently ductile to allow rolling, it may be cast as a thin sheet.

At step 612, dielectric sheets are assembled with electrode sheets in a configuration suitable for capacitor 500. For example, As described above with reference to FIGS. 5A-5C, a plurality of dielectric sheets 510 may be interleaved with a plurality of electrode sheets 514. Further, conductor 502 may couple every other electrode sheet 514 (for example, electrode sheets 514a and 514c) to terminal 503, and conductor 504 may couple the other electrode sheets 514 (for example, electrode sheets 514b and 514d) to terminal 505.

At step 614, a dielectric encapsulant is prepared. For example, a fluid dielectric material, such as dielectric encapsulant 522 described above with reference to FIG. 5A, may be prepared. In some embodiments, dielectric encapsulant 522 may include a composition equivalent to dielectric sheets 510 or a composition with tailored properties. In some embodiments, dielectric encapsulant 522 may have a dielectric constant similar to the dielectric sheets 510 but may be modified with conductive or semi-conductive particulate filler. Dielectric encapsulant 522 may have a resistance that is lower than the resistance of dielectric sheets 510. Accordingly, dielectric encapsulant 522 may shape the electric field between opposing electrode sheets 514, and thus protect capacitor 500 from failure when a large voltage potential is placed across terminals 503 and 505.

At step 616, an assembly of the dielectric sheets and the electrode sheets are encapsulated within the dielectric encapsulant. For example, dielectric sheets 510 and electrode sheets 514 assembled together in step 612 may be encapsulated within dielectric encapsulant 522 prepared in step 614. In some embodiments, dielectric sheets 510 and electrode sheets 514 may be placed in a mold in a vacuum. The vacuum may pull dielectric encapsulant 522 into the space between dielectric sheets 510 and electrode sheets 514 as described above with reference to FIG. 5A. The vacuum may also pull dielectric encapsulant 522 into the area within the mold surrounding the edges of dielectric sheets 510 and electrode sheets 514. Crosslinking or curing may be performed after vacuum infiltration to solidify the dielectric encapsulant 522.

Modifications, additions, or omissions may be made to method 600 without departing from the scope of the disclosure. For example, the order of the steps may be performed in a different manner than that described above and some steps may be performed at the same time. Additionally, each individual step may include additional steps without departing from the scope of the present disclosure. Furthermore, some steps may be omitted. For instance, nanoparticles, polymer, dielectric encapsulant, or any combination thereof may be purchased or separately formed and then otherwise used in method 600 rather than being formed during method 600 by the entity otherwise performing the other steps.

Figure 7:
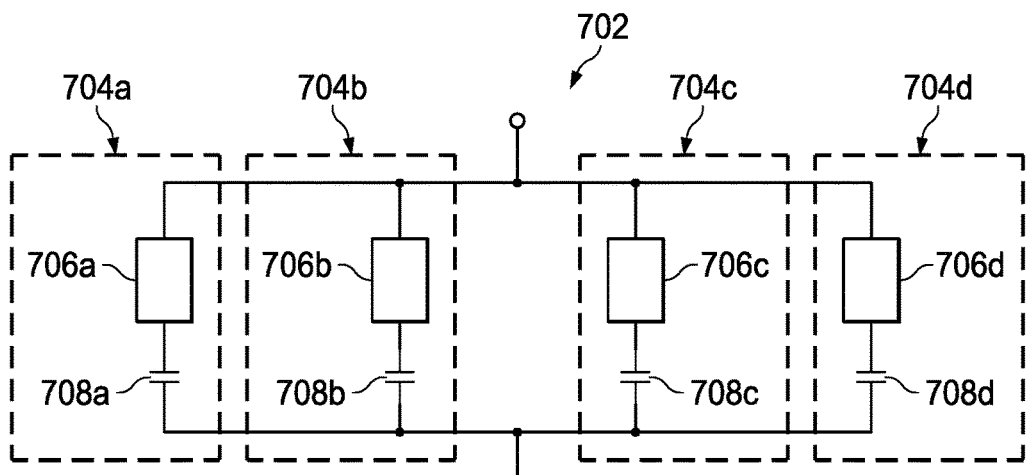
FIG. 7 illustrates a schematic diagram of an example capacitor array for a fuse-protected capacitor in a downhole electrocrushing drilling system.

FIG. 7 illustrates a schematic diagram of an example capacitor array for a fuse-protected capacitor in a downhole electrocrushing drilling system. As described above with reference to FIG. 3, a capacitor such as capacitor 404 or capacitor 414 may be implemented by multiple capacitors coupled in parallel with each other. As shown in FIG. 7, a capacitor may also be formed with an array of two or more fuse-protected branches.

Capacitor array 702 includes branches 704a, 704b, 704c, and 704d. Each individual branch is coupled in parallel with the other branches. Further, each individual branch includes a fuse coupled in series with a branch capacitor. For example, branch 704a includes fuse 706a coupled in series with branch capacitor 708a, branch 704b includes fuse 706b coupled in series with branch capacitor 708b, branch 704c includes fuse 706c coupled in series with branch capacitor 708c, and branch 704d includes fuse 706d coupled in series with branch capacitor 708d. Each branch capacitor 708a-d may be formed in the same manner as the capacitors described above with reference to FIGS. 4-6. Further, although capacitor array 702 is depicted in FIG. 7 as having four branches, capacitor array 702 may be implemented with any suitable number of branches coupled in parallel. The capacitance of each respective branch may be approximately equal to the capacitance of the branch capacitor in that respective branch. Further, the total capacitance of capacitor array 702 may be approximately equal to the sum of the capacitances of each branch coupled in parallel.

Fuses 706a-d in the respective branches 704a-d of capacitor array 702 protect capacitor array 702 from the failure of an individual branch capacitor. In the event that branch capacitor 708a fails due to an excessive voltage potential across the terminals of branch capacitor 708a, such a failure may cause an electrical short between the terminals of branch capacitor 708a. In such an event, the electrical short of the failed branch capacitor 708a will begin to discharge the charge stored on each of the other branch capacitors 708b-d within capacitor array 702. Thus, a large current will temporarily flow through branch 704a until fuse 706a is blown. When fuse 706a blows, branch 704a will transition from a short circuit to an open circuit. Thus, branch 704a may no longer contribute to the total capacitance of capacitor array 702. But, the short circuit of the failed capacitor 708a will no longer drain the charge from the other branch capacitors 708b-d within capacitor array 702. As a result, the remaining branches of capacitor array 702 may continue to contribute to the capacitance of capacitor array 702, and capacitor array 702 may continue to function as a capacitor as intended.

The fuse protection of each individual branch in capacitor array 702 may extend the useful life of capacitor array 702. For example, capacitor array 702 may be implemented as a charge capacitor in a pulse-generating circuit (such as pulse-generating circuit 400 described above with reference to FIG. 3) in a downhole electrocrushing drilling system. The fuse protection of individual branches of capacitor array 702 may allow capacitor array 702 to continue functioning as a charge capacitor when one or more of branch capacitors 708a-d fail. Accordingly, a pulse-generating circuit utilizing capacitor array 702 may continue to operate, and the downhole electrocrushing drilling system may continue to drill, despite the failure of one or more of branch capacitors 708a-d.

Figure 8A:
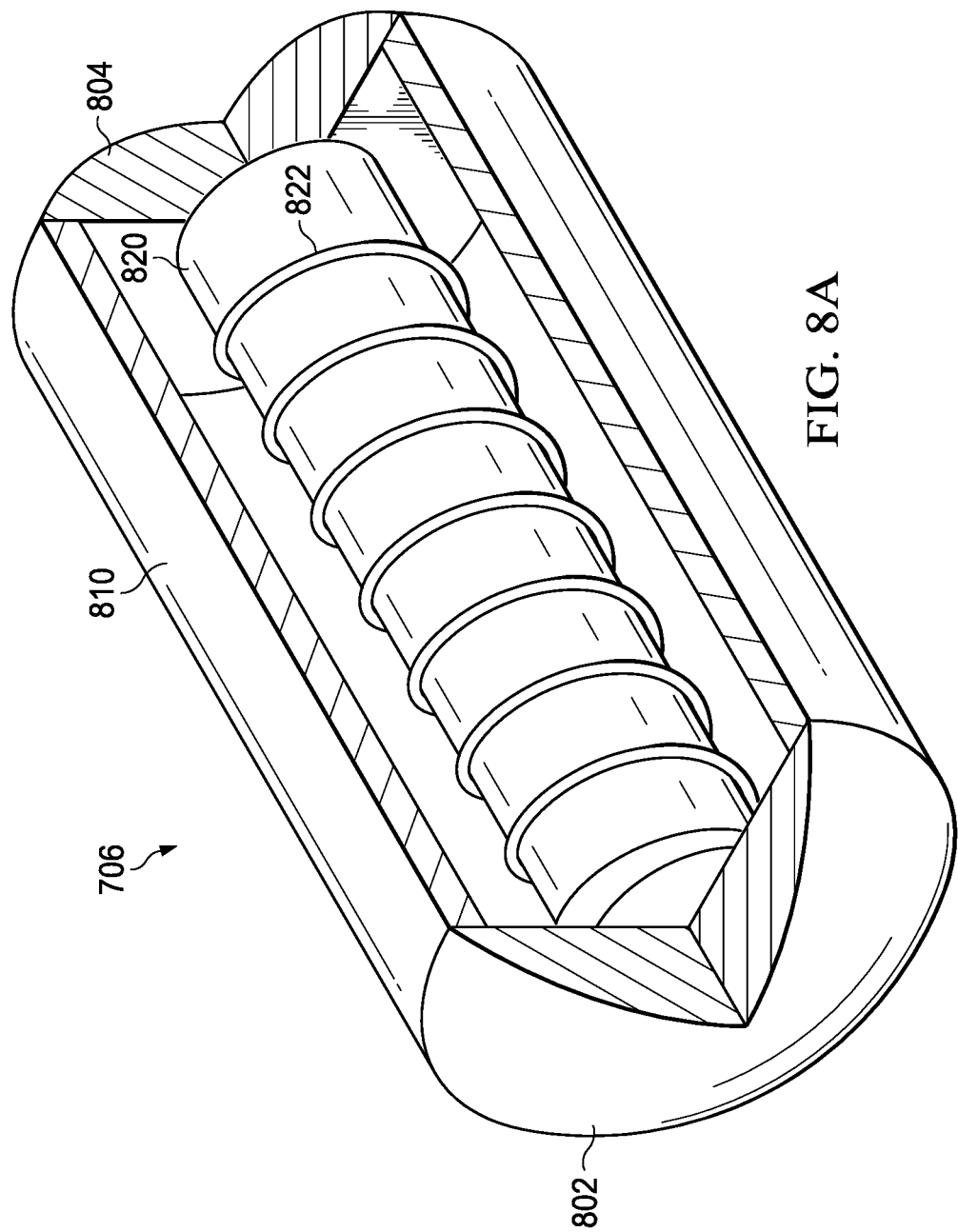
FIG. 8A illustrates a cut out view of components of an example fuse for a fuse-protected capacitor in a downhole electrocrushing drilling system.

FIG. 8A illustrates a cut out view of components of an example fuse for a fuse-protected capacitor in a downhole electrocrushing drilling system. Different instantiations of fuse 706 may be utilized, for example, as fuses 706a-d described above with reference to FIG. 7.

Fuse 706 includes contact 802, contact 804, outer cylinder 810, inner cylinder 820, and filament 822. As shown in FIG. 8A, filament 822 is electrically coupled between contact 802 and contact 804. Filament 822 may include an electrically conductive material such as copper wire, aluminum wire, or any other electrical conductor. During normal operation, filament 822 provides a low-resistance electrical coupling between contact 802 and 804. As shown in FIG. 8A, filament 822 is wrapped around inner cylinder 820. Inner cylinder 820 may include a thermally conductive material which draws heat away from filament 822. Inner cylinder 820 may draw sufficient heat away from filament 822 to prevent filament 822 from melting during normal operation. But, as described above with reference to FIG. 7, a branch capacitor in capacitor array 702 may fail and cause a short circuit condition across the branch capacitor. The short circuit condition causes an excessive current may temporarily flow through the branch capacitor and its corresponding fuse. The excessive current may cause portions of filament 822 to melt and/or vaporize, thus creating an open circuit between contacts 802 and 804. Accordingly, fuse 706 may prevent the failed branch capacitor from short-circuiting the other branches of capacitor array 702.

As described above with reference to FIGS. 7 and 8A, fuse 706 may be utilized within capacitor array 702, which may in turn be utilized within a pulse-generating circuit of a downhole electrocrushing drill system. In such applications, high-power electrical pulses may be applied to fuse 706, including at times soon after fuse 706 has blown. As described below with reference to FIG. 8B and FIG. 8C, fuse 706 may include elements, packed within outer cylinder 810, that may help disperse the molten material and/or vapor that results when filament 822 melts and/or vaporizes. Such dispersion of the molten material and/or vapor prevents an electrical arc forming across the molten material and/or vapor during a subsequent high-voltage electrical pulse.

Figure 8B:
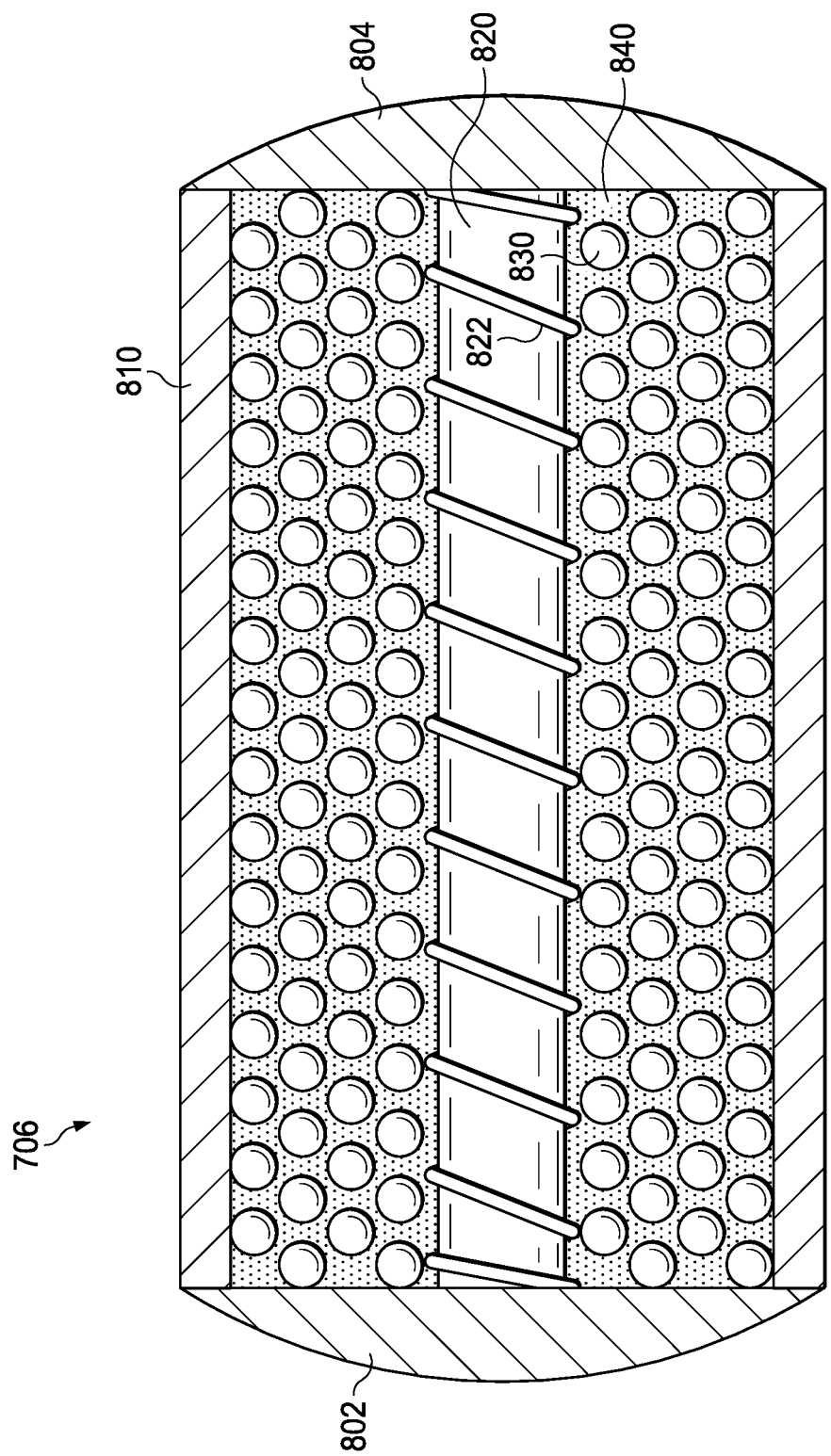
FIG. 8B illustrates a cross sectional view of an example fuse for a fuse-protected capacitor in a downhole electrocrushing drilling system.

FIG. 8B illustrates a cross sectional view of an example fuse for a fuse-protected capacitor in a downhole electrocrushing drilling system. As shown in FIG. 8B, the area between inner cylinder 820 and outer cylinder 810 may be filled with beads 830 and fluid 840. In some embodiments, the area between inner cylinder 820 and outer cylinder 810 may include air and/or a powder material in place of, or in combination with, fluid 840. Fluid 840 may include an insulating material and thus may insulate the windings of filament 822 from each other. Beads 830 have a spherical shape. Further, beads 830 may be hollow and may be formed with a material, such as glass, that shatters when fuse 706 blows. As described directly above with reference to FIG. 8A, when a branch capacitor of capacitor array 702 fails, the branch capacitor may generate a short circuit. As a result of a short circuit, an excessive current begins to flow through the branch capacitor and its corresponding fuse 706. Due to the rapid rise in electrical current, portions of filament 822 melt and/or vaporize in a rapid manner. The rapid melting and/or vaporization of filament 822 causes a shock wave through fluid 840. Further, any vaporization causes an increase in pressure within the walls of outer cylinder 810. As a result, beads 830 may shatter. The shattering of beads 830 provides an increased volume of space within outer cylinder 810 through which the molten material and/or vapor from filament 822 may disperse. Moreover, the remaining shards of the shattered beads 830 may provide many disjointed surfaces within the walls of outer cylinder 810. Thus, the molten material from filament 822 may disperse on the disjointed surfaces. Similarly, condensation from any vaporized portions of filament 822 may form on the disjointed surfaces.

The dispersion of the molten material and/or vapor on the many disjointed surfaces of the shattered beads 830 may prevent an electrical arc from forming across the molten material and/or vapor during a high-power electrical pulse that may be applied across fuse 706 after fuse 706 has blown, or to prevent a restrike during the fuse-opening pulse. Accordingly, after fuse 706 has blown, fuse 706 may maintain its operation as an open circuit despite the application of high-power electrical pulses across contacts 802 and 804. Accordingly, capacitor array 702 may continue to function as intended within a pulse-generating circuit of a downhole electrocrushing drilling system as described above with reference to FIGS. 7 and 8A.

Figure 8C:
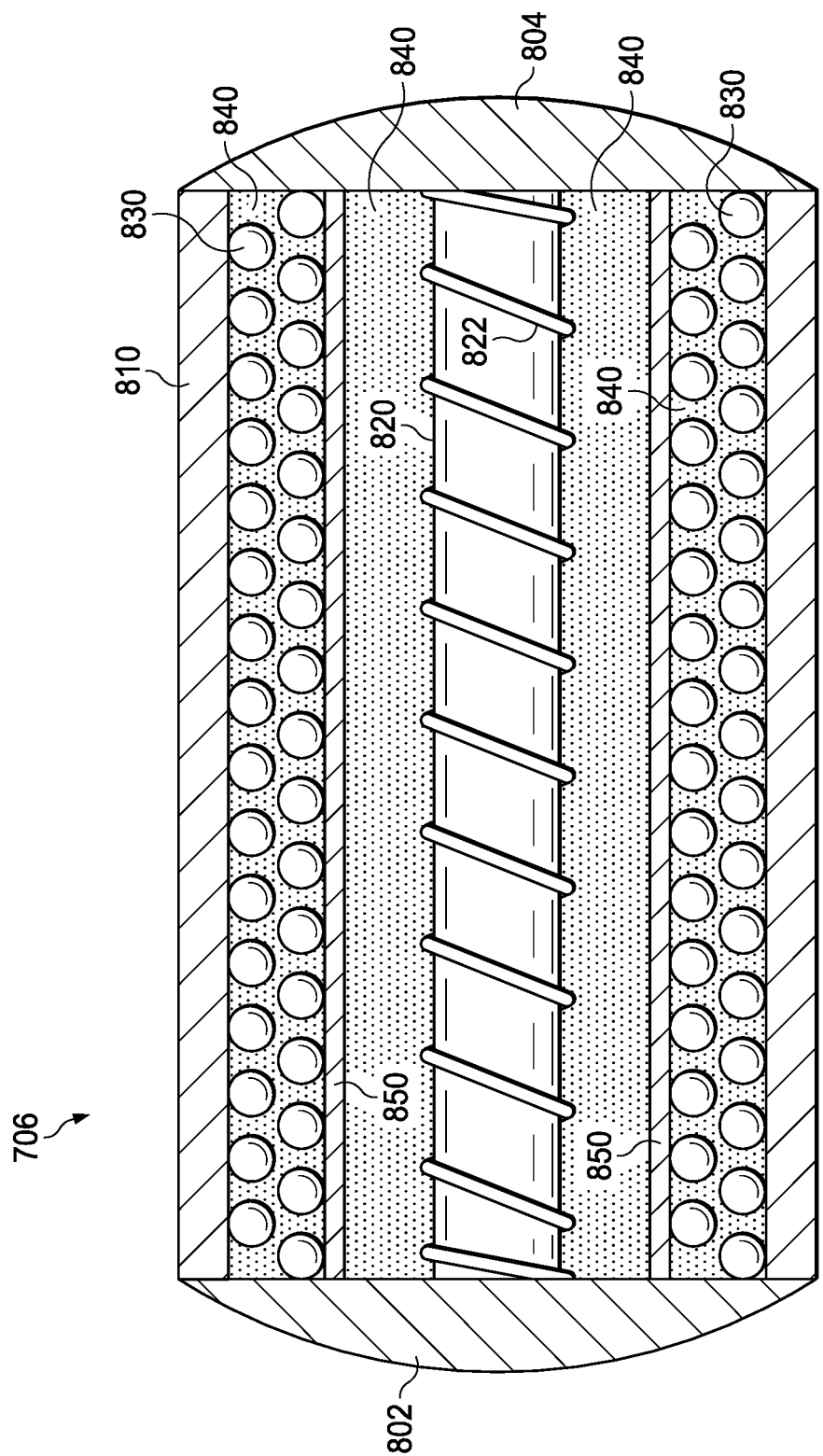
FIG. 8C illustrates a cross sectional view of an example fuse, with an intermediate barrier, for a fuse-protected capacitor in a downhole electrocrushing drilling system.

FIG. 8C illustrates a cross sectional view of an example fuse, with an intermediate barrier, for a fuse-protected capacitor in a downhole electrocrushing drilling system. As shown in FIG. 8C, some embodiments of fuse 706 may include barrier 850. Barrier 850 has a cylindrical shape and may form an intermediate barrier that separates the space between inner cylinder 820 and outer cylinder 810 into two spaces. The space between outer cylinder 810 and barrier 850 includes fluid 840 and beads 830. The space between barrier 850 and inner cylinder 820 includes fluid 840, but may be free of beads 830. Thus, the insulation provided by fluid 840 to the windings of filament 822 may be uniform across the length of inner cylinder 820. The uniform insulation may further prevent electrical arcs from forming across different windings of filament 822 when high-power electrical pulses are applied across contacts 802 and 804 of fuse 706.

Similar to beads 830, barrier 850 may be formed with a material, such as glass or a thin layer of plastic, which may shatter when fuse 706 blows. The shattering of barrier 850 and beads 830 may provide an increased volume of space within outer cylinder 810 in a similar manner as described above for beads 830 with reference to FIG. 8B. The molten material and/or vapor from filament 822 may disperse throughout this increased area. Further, the remaining shards of the shattered barrier 850 and beads 830 may provide many disjointed surfaces within the walls of outer cylinder 810. Molten material from filament 822 may disperse on the disjointed surfaces. Similarly, condensation from any vaporized portions of filament 822 may form on the disjointed surfaces. As described above with reference to FIG. 8B, the dispersion of the molten material and/or vapor on the many disjointed surfaces may prevent an electrical arc from forming across the molten material and/or vapor during a high-power electrical pulse that may be applied across fuse 706 after fuse 706 has blown.

Figure 9:
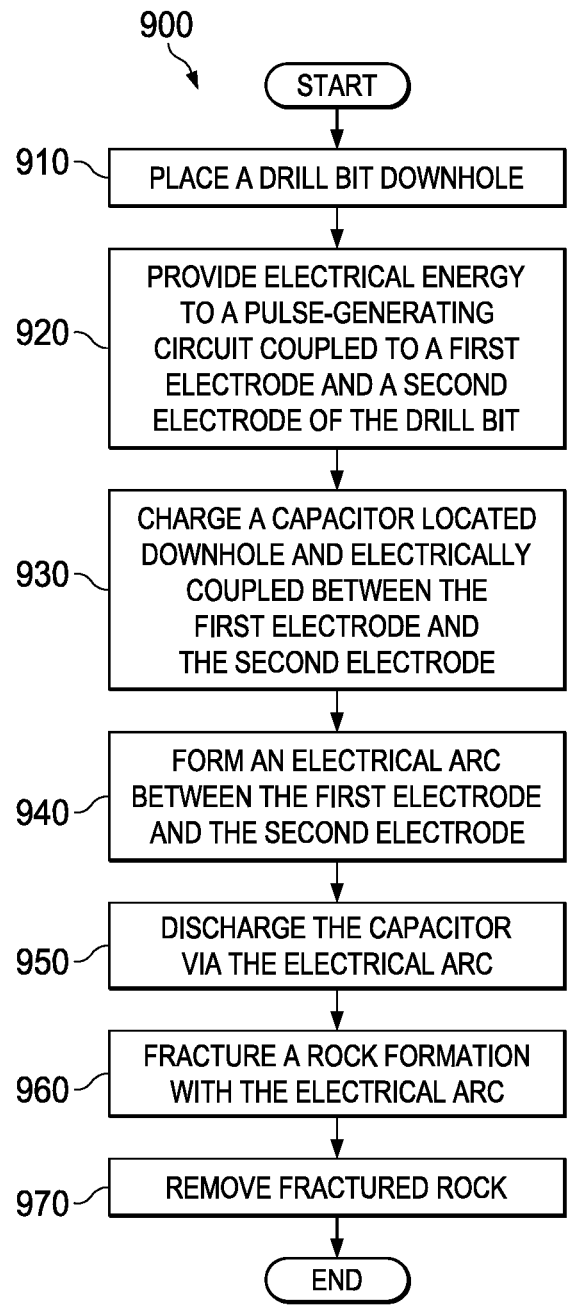
FIG. 9 illustrates a flow chart of exemplary method for drilling a wellbore.

FIG. 9 illustrates a flow chart of exemplary method for drilling a wellbore.

Method 900 may begin and at step 910 a drill bit may be placed downhole in a wellbore. For example, drill bit 114 may be placed downhole in wellbore 116 as shown in FIG. 1.

At step 920, electrical power may be provided to a pulse-generating circuit coupled to a first electrode and a second electrode of the drill bit. For example, as described above with reference to FIG. 4, pulse-generating circuit 400 may be implemented within pulsed-power tool 230 of FIG. 2. And as described above with reference to FIG. 2, pulsed-power tool 230 may receive power from a power source on the surface, from a power source located downhole, or from a combination of a power source on the surface and a power source located downhole. The power may be provided to pulse-generating circuit 400 within pulse-power tool 230 at power source input 401. As further shown in FIGS. 2 and 4, the pulse generating circuit may be coupled to a first electrode (such as electrode 208) and a second electrode (such as ground ring 250) of drill bit 114.

At step 930, a capacitor located downhole and electrically coupled between the first electrode and the second electrode may be charged. For example, as shown in FIG. 4, capacitor 414 of pulse-generating circuit 400 may be coupled between a first electrode (such as electrode 208) and a second electrode (such as ground ring 250) of drill bit 114. Moreover, when switch 406 of pulse-generating circuit 400 closes, electrical current may flow through first winding 411 of transformer 410. Second winding 412 of transformer 410 is electromagnetically coupled to first winding 411. Accordingly, when switch 406 closes and an electrical current flows through first winding 411, a current also flows through second winding 412. The current through second winding 412 may charge capacitor 414, thus increasing the voltage across capacitor 414. In some embodiments, capacitor 414 may be formed in a similar manner as described above for capacitor 500 with reference to FIGS. 5A-5C. For example, the capacitor may include at least one dielectric sheet having a composite material including a polymer matrix formed from a polymer component and a nanoparticle component that increases the dielectric constant of the composite material above that of the polymer component.

At step 940, an electrical arc may be formed between the first electrode and the second electrode of the drill bit. And at step 950, the capacitor may discharge via the electrical arc. For example, as the voltage across capacitor 414 increases during step 930, the voltage across electrode 208 and ground ring 250 also increases. As described above with reference to FIGS. 1 and 2, when the voltage across electrode 208 and ground ring 250 becomes sufficiently large, an arc may form through a rock formation that is in contact with electrode 208 and ground ring 250. The arc may provide a temporary electrical short between electrode 208 and ground ring 250, and thus may discharge, at a high current level, the voltage built up across capacitor 414.

At step 960, the rock formation at an end of the wellbore may be fractured with the electrical arc. For example, as described above with reference to FIGS. 1 and 2, the arc greatly increases the temperature of the portion of the rock formation through which the arc flows as well as the surrounding formation and materials. The temperature is sufficiently high to vaporize any water or other fluids that may be touching or near the arc and may also vaporize part of the rock itself. The vaporization process creates a high-pressure gas which expands and, in turn, fractures the surrounding rock.

At step 970, fractured rock may be removed from the end of the wellbore. For example, as described above with reference to FIG. 1, electrocrushing drilling fluid 122 may move the fractured rock away from the electrodes and uphole away from the bottom of wellbore 116.

Subsequently, method 900 may end. Modifications, additions, or omissions may be made to method 900 without departing from the scope of the disclosure. For example, the order of the steps may be performed in a different manner than that described and some steps may be performed at the same time. Additionally, each individual step may include additional steps without departing from the scope of the present disclosure.

Embodiments herein may include:

A. A downhole drilling system including a drill bit having a first electrode and a second electrode. The downhole drilling system may also have a pulse-generating circuit coupled to the first electrode and the second electrode. A capacitor within the pulse-generating circuit may include a plurality of electrode sheets and a plurality of dielectric sheets interleaved with the plurality of electrode sheets. Each of the dielectric sheets may include a composite material including a polymer matrix formed from a polymer component and a nanoparticle component that increases the dielectric constant of the composite material above that of the polymer component.

B. A capacitor including a first electrode sheet, a second electrode sheet, and a dielectric sheet located between the first and second electrode sheets. The dielectric sheet has a composite material including a polymer matrix formed from a polymer component and a nanoparticle component that increases the dielectric constant of the composite material above that of the polymer component.

C. A downhole drilling system including a drill bit having a first electrode and a second electrode. The downhole drilling system also includes a bottom-hole assembly having a pulse-generating circuit coupled to the drill bit to provide an electrical pulse to the drill bit, and a capacitor within the pulse-generating circuit. The capacitor includes a plurality of branches coupled in parallel with each other, each of the plurality of branches having a fuse and a branch capacitor coupled in series with the fuse.

D. A method including placing a drill bit downhole in a wellbore, providing electrical power to a pulse-generating circuit coupled to a first electrode and a second electrode of the drill bit, and charging a capacitor located downhole and electrically coupled between the first electrode and the second electrode, the capacitor having at least one dielectric sheet having a composite material including a polymer matrix formed from a polymer component and a nanoparticle component that increases the dielectric constant of the composite material above that of the polymer component. The method further includes forming an electrical arc between the first electrode and the second electrode of the drill bit, discharging the capacitor via the electrical arc, fracturing a rock formation at an end of the wellbore with the electrical arc, and removing fractured rock from the end of the wellbore.

Each of embodiments A, B, C, and D may have one or more of the following additional elements in any combination:

Element 1: wherein each of the dielectric sheets has a dielectric constant of at least 3 at 0.1 Hz to 1.0 MHz frequency and 150 degrees Centigrade. Element 2: wherein the capacitor is coupled between the first electrode and the second electrode of the drill bit. Element 3: wherein the capacitor is coupled between two nodes of the pulse-generating circuit, the two nodes independent from a first node of the pulse-generating circuit connected to the first electrode and a second node of the pulse-generating circuit connected to the second electrode. Element 4: wherein the polymer matrix includes a silicone polymer having the structural formula:

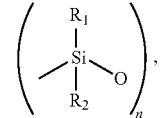

wherein: n is at least 10; none, one or both of $R_1$ and $R_2$ are absent; $R_1$ and $R_2$, if both present, are the same substituent or different substituents; and $R_1$ or $R_2$ are H, a carbon (C) containing group, a nitrogen (N)-containing group, an oxygen (O)-containing group, a halogen-containing group, or a Si-containing group. Element 5: wherein the nanoparticle component has ferroelectric nanoparticles embedded in the polymer matrix. Element 6: wherein each of the plurality of dielectric sheets has spacers protruding from a surface of the dielectric sheet. Element 7: wherein the capacitor has a dielectric encapsulant that fills space between the interleaved dielectric sheets and electrode sheets. Element 8: wherein the dielectric encapsulant has a dielectric constant less than a dielectric constant of the dielectric sheets. Element 9: wherein each of the plurality of electrode sheets has a plurality of rounded edges. Element 10: wherein the capacitor is located adjacent to at least one drilling-fluid channel within a circular cross-section of a downhole pulsed-power drilling tool. Element 11: wherein the drill bit is selected from the group consisting of an electrocrushing drill bit or an electrohydraulic drill bit. Element 12: wherein the fuse includes an outer cylinder, a filament located within the outer cylinder, an insulating fluid located within the outer cylinder, and a plurality of beads located within the outer cylinder. Element 13: wherein the plurality of beads are hollow and include glass. Element 14:

wherein the plurality of beads have a spherical shape. Element 15: wherein the fuse further includes an inner cylinder located within the outer cylinder, and the filament is wrapped around the inner cylinder. Element 16: wherein the inner cylinder includes a ceramic material. Element 17: wherein the fuse further includes an intermediate barrier located between the outer cylinder and the filament. Element 18: wherein the plurality of beads are located between the intermediate barrier and the outer cylinder. Element 19: wherein the intermediate barrier includes glass.

Although the present disclosure has been described with several embodiments, various changes and modifications may be suggested to one skilled in the art. It is intended that the present disclosure encompasses such various changes and modifications as falling within the scope of the appended claims.

What is claimed is:

1. A downhole drilling system, comprising:
a drill bit including a first electrode and a second electrode;
a pulse-generating circuit coupled to the first electrode and the second electrode; and
a capacitor within the pulse-generating circuit, the capacitor comprising:
a plurality of electrode sheets;
a plurality of dielectric sheets interleaved with the plurality of electrode sheets, each of the dielectric sheets comprising a composite material including a polymer matrix formed from a polymer component and a nanoparticle component that increases the dielectric constant of the composite material above that of the polymer component; and
a dielectric encapsulant that fills space between the interleaved dielectric sheets and electrode sheets.

2. The downhole drilling system of claim 1, wherein each of the plurality of dielectric sheets has a dielectric constant of at least 3 at 0.1 Hz to 1.0 MHz frequency and 150 degrees Centigrade.

3. The downhole drilling system of claim 1, wherein the capacitor is coupled between the first electrode and the second electrode of the drill bit.

4. The downhole drilling system of claim 1, wherein the capacitor is coupled between two nodes of the pulse-generating circuit, the two nodes independent from a first node of the pulse-generating circuit connected to the first electrode and a second node of the pulse-generating circuit connected to the second electrode.

5. The downhole drilling system of claim 1, wherein the polymer matrix comprises a silicone polymer having the structural formula:

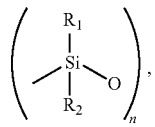

wherein:
n is at least 10;
none, one or both of $R_1$ and $R_2$ are absent;
$R_1$ and $R_2$, if both present, are the same substituent or different substituents; and
$R_1$ or $R_2$ are H, a carbon (C) containing group, a nitrogen (N)-containing group, an oxygen (O)-containing group, a halogen-containing group, or a Si-containing group.

6. The downhole drilling system of claim 1, wherein the nanoparticle component comprises ferroelectric nanoparticles embedded in the polymer matrix.

7. The downhole drilling system of claim 1, wherein each of the plurality of dielectric sheets further comprises spacers protruding from a surface of the dielectric sheet.

8. The downhole drilling system of claim 1, wherein:
the dielectric encapsulant has a dielectric constant less than a dielectric constant of the plurality of dielectric sheets.

9. The downhole drilling system of claim 1, wherein each of the plurality of electrode sheets comprises a plurality of rounded edges.

10. The downhole drilling system of claim 1, wherein the capacitor is located adjacent to at least one drilling-fluid channel within a circular cross-section of a downhole pulsed-power drilling tool.

11. A capacitor, comprising:
a plurality of electrode sheets;
a plurality of dielectric sheets interleaved with the plurality of electrode sheets, each of the dielectric sheets comprising a composite material including a polymer matrix formed from a polymer component and a nanoparticle component that increases the dielectric constant of the composite material above that of the polymer component; and
a dielectric encapsulant that fills space between the interleaved dielectric sheets and electrode sheets.

12. The capacitor of claim 11, wherein the polymer matrix comprises a silicone polymer having the structural formula:

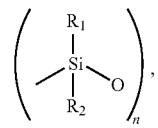

wherein:
n is at least 10;
none, one or both of $R_1$ and $R_2$ are absent;
$R_1$ and $R_2$, if both present, are the same substituent or different substituents; and
$R_1$ or $R_2$ are H, a carbon (C) containing group, a nitrogen (N)-containing group, an oxygen (O)-containing group, a halogen-containing group, or a Si-containing group.

13. The capacitor of claim 11, wherein the nanoparticle component comprises ferroelectric nanoparticles embedded in the polymer matrix.

14. The capacitor of claim 11, wherein each of the plurality of dielectric sheets further comprises spacers protruding from a surface of the dielectric sheet.

15. The capacitor of claim 11, wherein the dielectric encapsulant has a dielectric constant less than a dielectric constant of the plurality of dielectric sheets.

16. The capacitor of claim 11, wherein each of the plurality of electrode sheets comprises a plurality of rounded edges.

* * * * *